United States Patent [19]
Trimble

[11] Patent Number: 5,158,733
[45] Date of Patent: * Oct. 27, 1992

[54] METHOD OF MAKING COMPOSITE CYCLE FRAME COMPONENTS

[76] Inventor: Brent J. Trimble, P.O. Box 246, Berryville, Ark. 72616

[*] Notice: The portion of the term of this patent subsequent to Feb. 20, 2007 has been disclaimed.

[21] Appl. No.: 608,448

[22] Filed: Nov. 2, 1990

Related U.S. Application Data

[60] Division of Ser. No. 435,907, Nov. 14, 1989, Pat. No. 4,986,949, which is a division of Ser. No. 207,631, Jun. 16, 1988, Pat. No. 4,889,355, which is a continuation-in-part of Ser. No. 123,338, Nov. 20, 1987, Pat. No. 4,902,458, which is a continuation-in-part of Ser. No. 53,370, May 12, 1987, Pat. No. 4,850,607, which is a continuation-in-part of Ser. No. 861,983, May 12, 1986, abandoned.

[51] Int. Cl.$^5$ .................. B29C 43/18; B29C 43/10
[52] U.S. Cl. .................. 264/258; 264/279; 264/314; 280/281.1
[58] Field of Search ............ 264/258, 257, 279, 314, 264/317, 315, 316, 319; 280/281.1, 288.1, 288.2, 288.3

[56] References Cited

U.S. PATENT DOCUMENTS

| | | |
|---|---|---|
| 2,182,828 | 12/1939 | Stutsman . |
| 2,370,726 | 3/1945 | Hess et al. . |
| 2,729,466 | 1/1956 | Giordani . |
| 2,827,306 | 3/1958 | Roder . |
| 3,233,916 | 2/1966 | Bowden . |
| 3,268,636 | 8/1966 | Angell . |
| 3,375,024 | 3/1968 | Bowden . |
| 3,493,240 | 2/1970 | Jenks . |
| 3,641,230 | 2/1972 | Jenks . |
| 3,755,037 | 8/1973 | Erwin . |
| 3,833,242 | 9/1974 | Thompson, Jr. . |
| 3,884,521 | 5/1975 | Moore . |
| 4,015,854 | 4/1977 | Ramond . |

(List continued on next page.)

FOREIGN PATENT DOCUMENTS

| | | |
|---|---|---|
| 591926 | 9/1947 | Fed. Rep. of Germany . |
| 944173 | 6/1956 | Fed. Rep. of Germany . |
| 950982 | 9/1956 | Fed. Rep. of Germany . |

(List continued on next page.)

OTHER PUBLICATIONS

Article entitled "Cycles" Sep. 1986 issue of *Popular Mechanics* by Norman Mayersohn, pp. 46 and 48.
Article entitled "Sanderson outruns high technology to win ABC time trial" May 13, 1985 edition of *Anchorage Daily News* by Lew Freedman, p. C-10.
Bicycling Magazine, Jul., 1986, pp. 66-68, 70-72, 74 and 78-79.
Bicycling Magazine, Jun., 1987, the cover and pp. 40, 42, 160 and 162, Kestral 4000.
Bicycle Guide magazine, Aug. 1987, pp. 36-39 and 68, Look Kevlar 2000.
Article published in *Bicycle Guide*, Aug. 1987 issue entitled "A Taste of the Future," pp. 20-29.
Article published in *Bicycle Guide* Dec. 1985 issue, p. 74.
Article published in *Bicycle Guide* Aug. 1987 issue entitled "Kestral 4000" pp. 30-35.

Primary Examiner—Jay H. Woo
Assistant Examiner—James P. Mackey
Attorney, Agent, or Firm—Pollock, Vande Sande & Priddy

[57] ABSTRACT

A method of making generally hollow components and assemblies for a bicycle frame from composite materials, such as unidirectional structural fibers impregnated with a heat curable synthetic resin. Opposing parts of at least two adjacent wall sections are overlapped to form a shell and the overlapped parts are compressed together between internal and external pressing members. The shell is then cured while under compression to provide a pressure cured juncture integrally uniting the wall sections and forming a generally hollow bicycle frame component.

22 Claims, 10 Drawing Sheets

U.S. PATENT DOCUMENTS

| | | |
|---|---|---|
| 4,047,731 | 9/1977 | Van Auken . |
| 4,062,917 | 12/1977 | Hill . |
| 4,183,776 | 1/1980 | Staub . |
| 4,230,332 | 10/1980 | Porsche . |
| 4,264,389 | 4/1981 | Staub et al. . |
| 4,368,897 | 1/1983 | Brown . |
| 4,411,333 | 10/1983 | Bothwell . |
| 4,437,679 | 3/1984 | Campagnolo . |
| 4,471,020 | 9/1984 | McCarthy . |
| 4,479,662 | 10/1984 | Defour et al. . |
| 4,493,749 | 1/1985 | Brezina . |
| 4,511,523 | 4/1985 | Hsu . |
| 4,513,986 | 4/1985 | Trimble . |
| 4,529,216 | 7/1985 | Spekner . |
| 4,534,578 | 8/1985 | Keller . |
| 4,548,422 | 10/1985 | Michel et al. . |
| 4,565,595 | 1/1986 | Whitener . |
| 4,613,146 | 9/1986 | Sharp et al. . |
| 4,627,307 | 12/1986 | Yamazawa et al. . |
| 4,650,620 | 3/1987 | Owen et al. . |
| 4,657,795 | 4/1987 | Foret . |
| 4,673,451 | 6/1987 | Yamazawa . |
| 4,705,286 | 11/1987 | Lauzier . |
| 4,724,115 | 2/1988 | Freeman . |
| 4,740,346 | 4/1988 | Freeman . |
| 4,828,285 | 5/1989 | Foret et al. . |
| 4,900,048 | 2/1990 | Derujinsky . |
| 4,900,050 | 2/1990 | Bishop et al. . |
| 4,902,458 | 2/1990 | Trimble ................................ 264/258 |
| 4,986,949 | 1/1991 | Trimble ................................ 264/314 |

FOREIGN PATENT DOCUMENTS

| | | |
|---|---|---|
| 2455141 | 3/1975 | Fed. Rep. of Germany . |
| 2453135 | 5/1975 | Fed. Rep. of Germany . |
| 475337 | 5/1915 | France . |
| 839373 | 4/1939 | France . |
| 877814 | 1/1943 | France . |
| 2458445 | 6/1956 | France . |
| 1367704 | 6/1964 | France . |
| 2487769 | 2/1982 | France . |
| 2576576 | 8/1986 | France . |
| 1163835 | 7/1986 | Japan . |
| 191124 | 2/1937 | Switzerland . |
| 3568 | of 1894 | United Kingdom . |
| 902 | of 1898 | United Kingdom . |
| 303619 | 11/1927 | United Kingdom . |
| 1361394 | 7/1974 | United Kingdom . |
| 2117333 | 10/1983 | United Kingdom . |

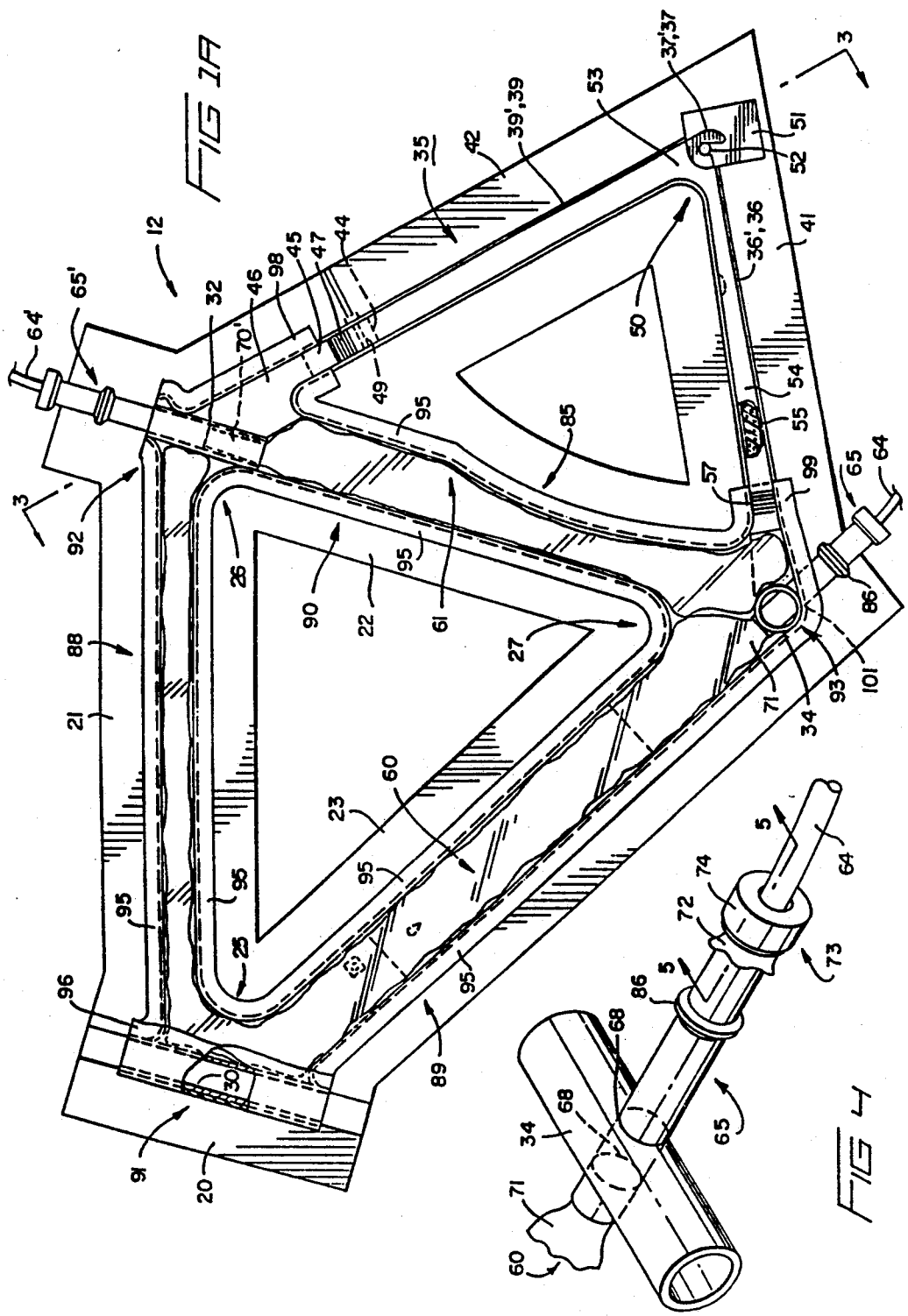

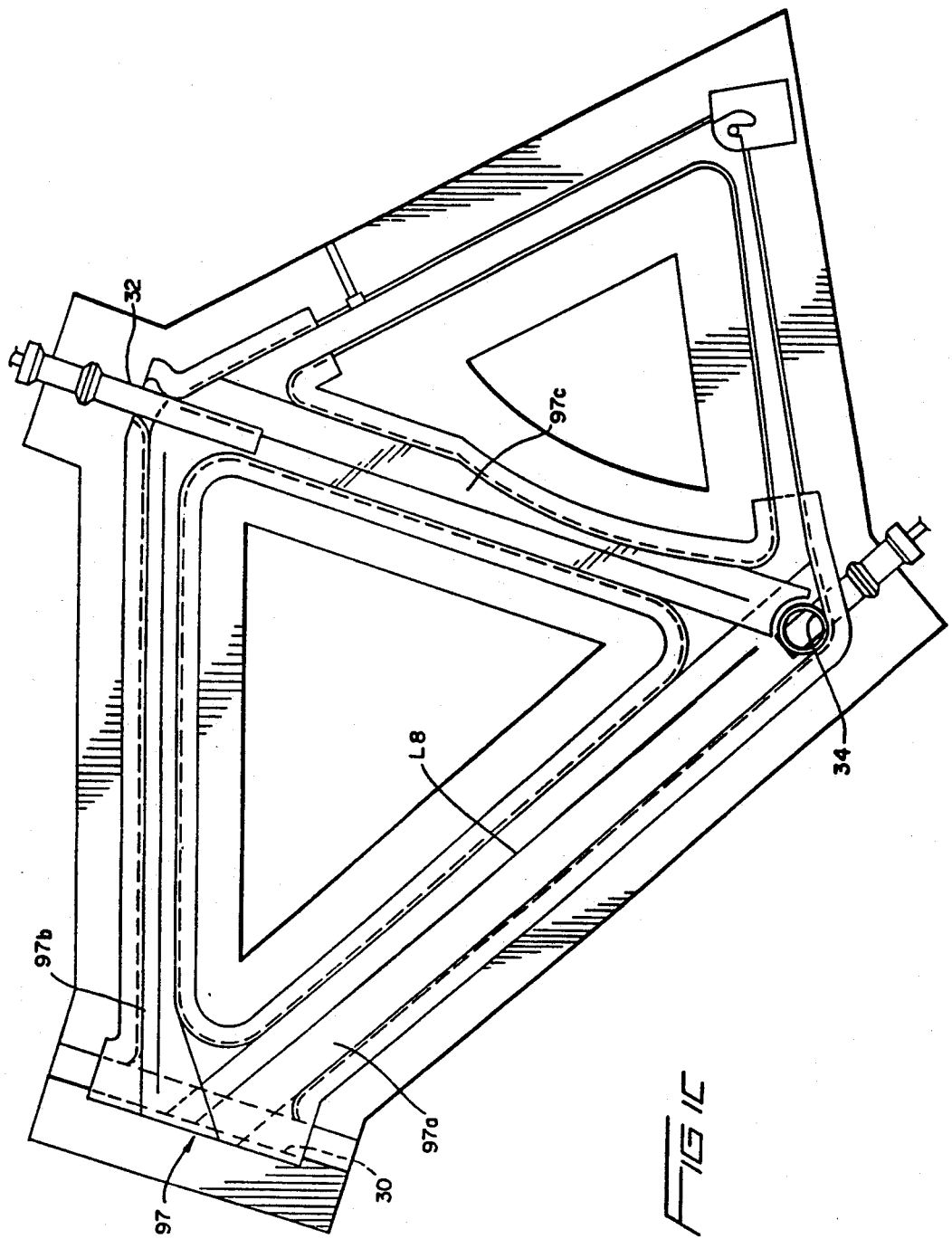

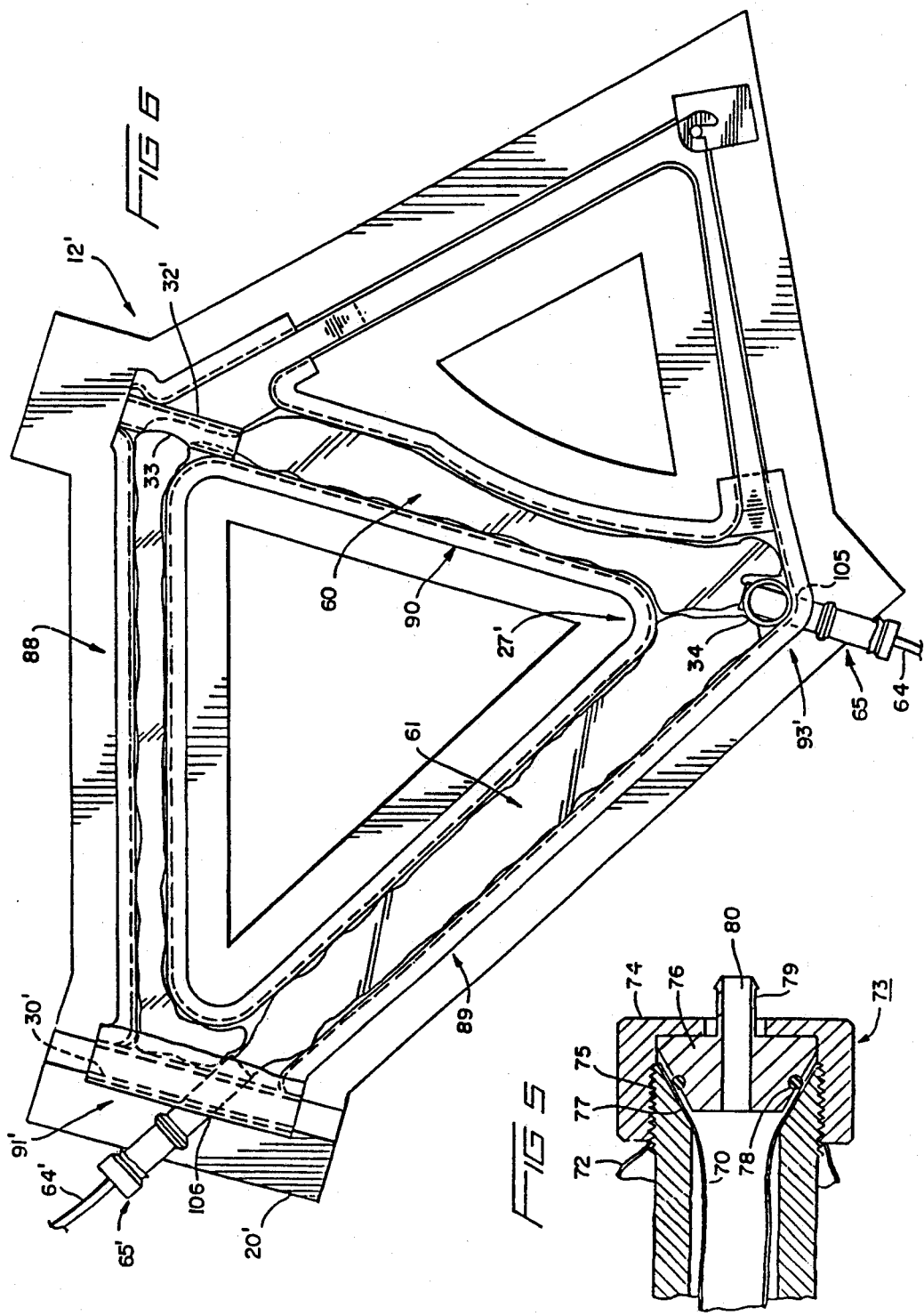

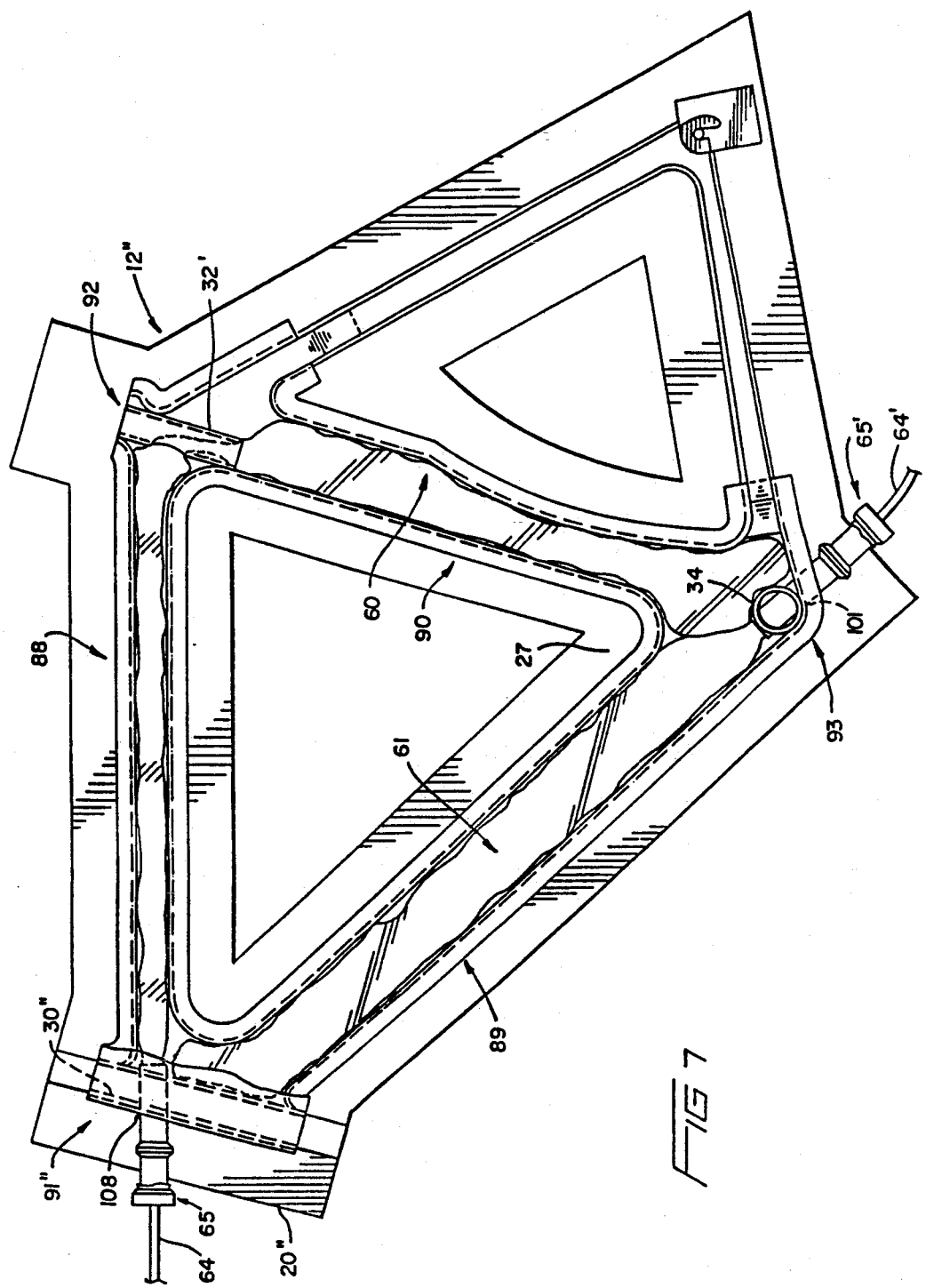

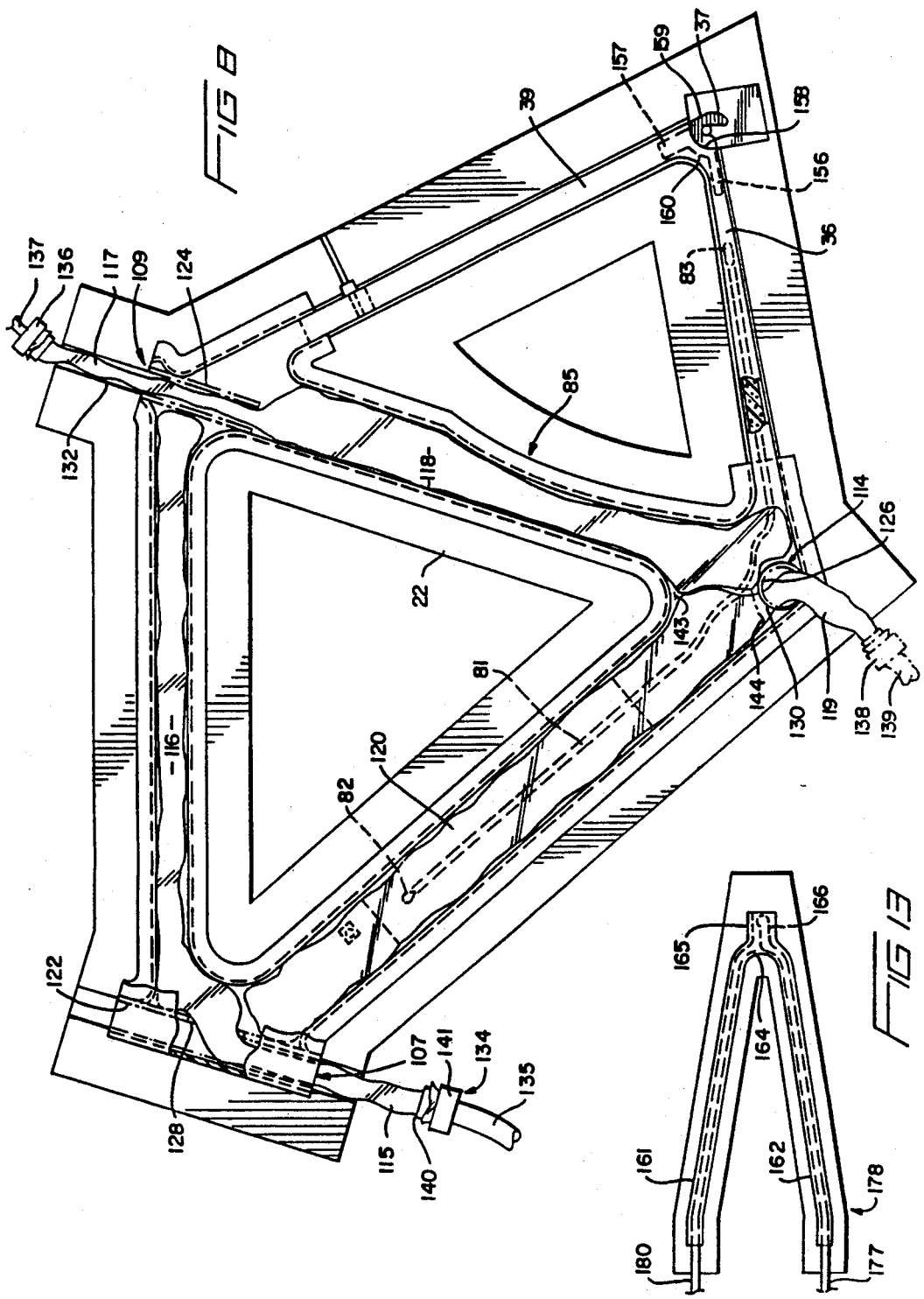

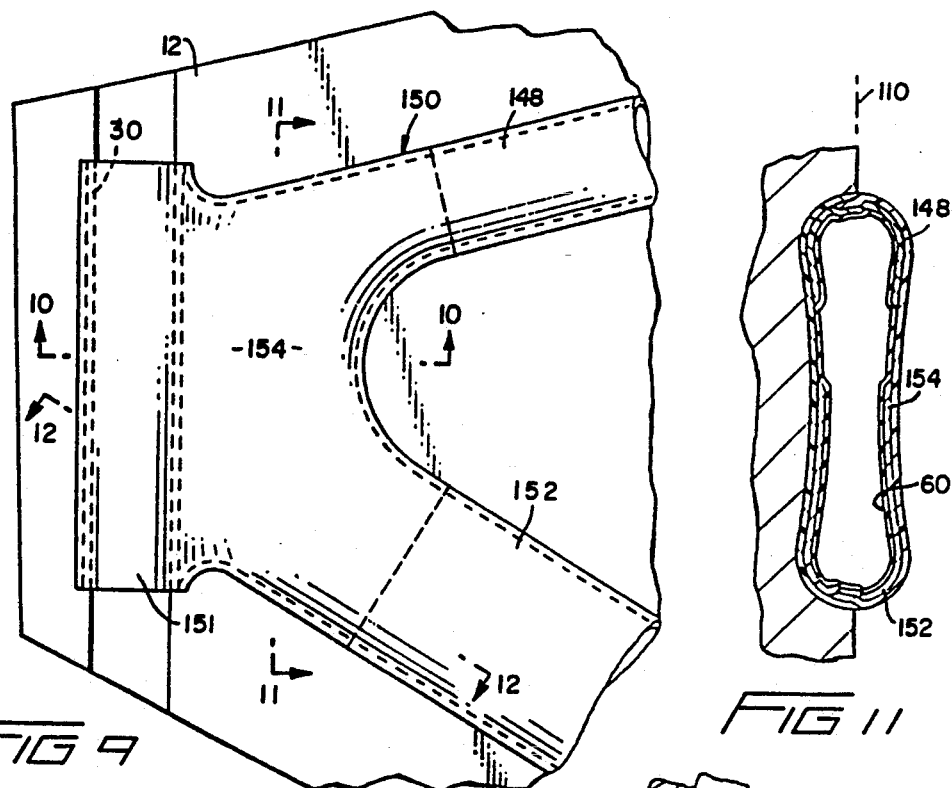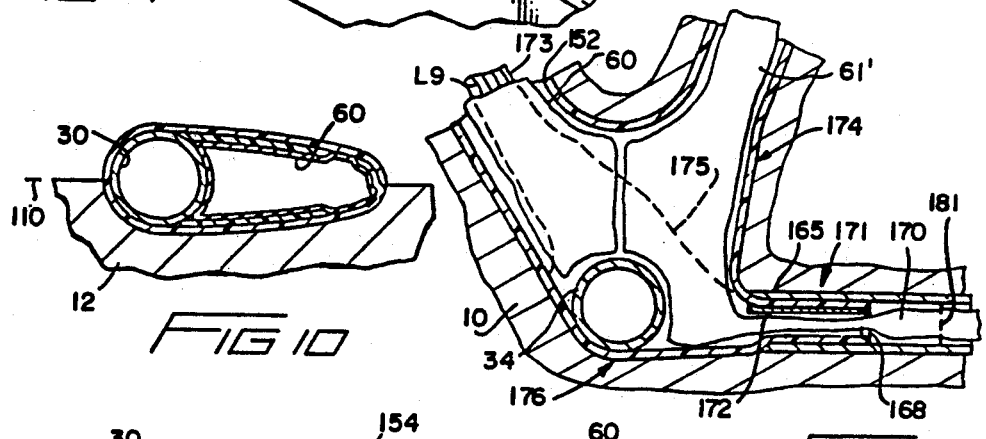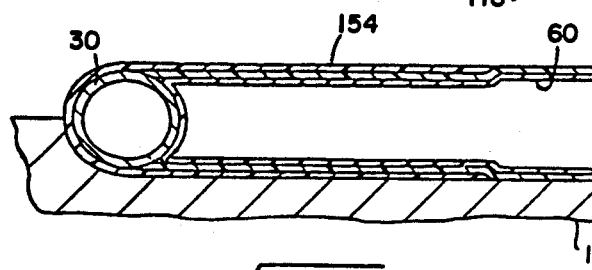

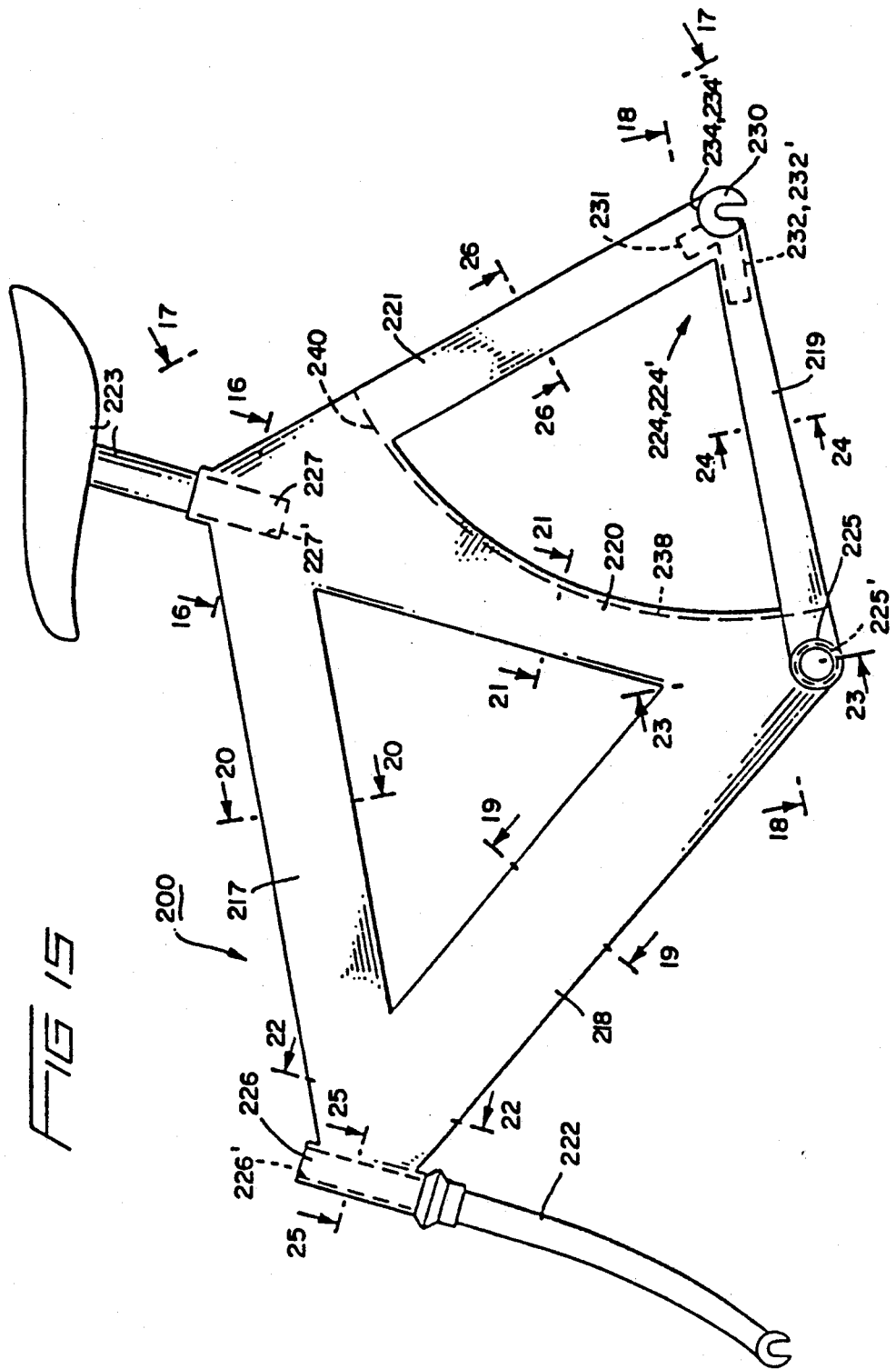

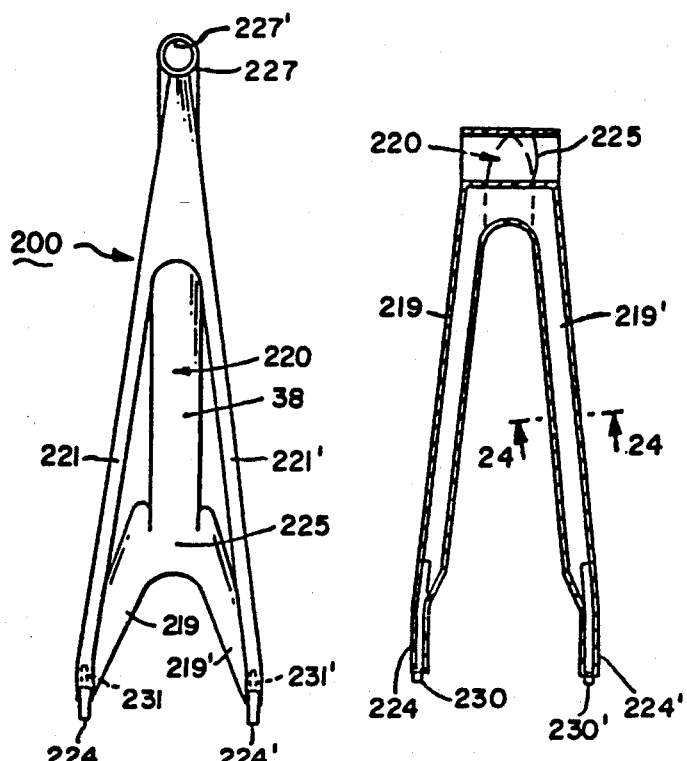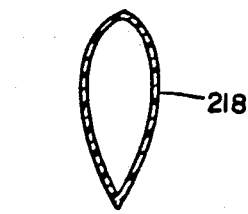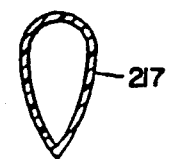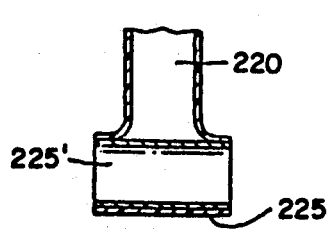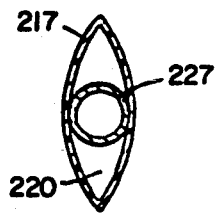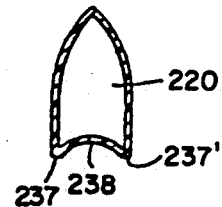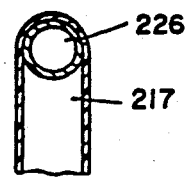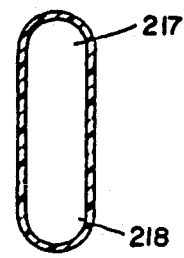

METHOD OF MAKING COMPOSITE CYCLE FRAME COMPONENTS

RELATED APPLICATIONS

This application is a division of Ser. No. 435,907 filed Nov. 14, 1989 (now U.S. Pat. No. 4,986,949), which was a division of Ser. No. 207,631 filed Jun. 16, 1988 (now U.S. Pat. No. 4,889,355), which was a continuation-in-part of Ser. No. 123,338 filed Nov. 20, 1987 (now U.S. Pat. No. 4,902,458), which was a continuation-in-part of Ser. No. 053,370 filed May 12, 1987 (now U.S. Pat. No. 4,850,607), which was a continuation-in-part of Ser. No. 861,983 filed May 12, 1986, which was abandoned in favor of Ser. No. 149,984 filed Jan. 29, 1988 (now U.S. Pat. No. 4,941,674).

TECHNICAL FIELD

The present invention relates to composite cycle frames and to methods for making such frames. In particular, the present invention relates to generally hollow cycle frame components and assemblies made from composite materials of fibers and synthetic resin and to methods of making such components and assemblies.

BACKGROUND OF THE INVENTION

Conventional bicycle frames are assemblies built from individual tubes which are secured together by welding, brazing or by using other means for joining the tubes. In naming the structural members of bicycle frames, the individual frame tubes were designated by their location in relation to the other major components or assemblies used to make up the functioning bicycle. Thus, it was that the short frame tube which supported the "head" axle joining the handlebar assembly and the front wheel fork was referred to as the "head" tube, the tube which supported the seat post and was connected to the pedal axle support (the bottom bracket) was referred to as the "seat" tube, the tube which joined the head tube and the top of the seat tube was referred to as the "top" tube, the tube which descended from the head tube to the bottom bracket was referred to as the "down" tube, the pair of tubes which descended from the seat tube to the ends of the rear wheel axle, with one tube on either side of the rear wheel, were referred to as the "seat stays", and the pair of tubes which connected the bottom bracket to the ends of the seat stays at the rear wheel axle, with one tube on either side of the rear wheel, were referred to as the "chain stays".

The multiplicity of connections required to secure these individual structural parts together, combined with the different forces encountered by the bicycle as it is ridden, cause a variety of problems. It is not unusual, for example, for one or more of the joints or connections on a conventional bicycle frame to fail, making the entire frame unsuitable for use until the connection is repaired. For many frames, the cost of straightening the frame and repairing the connection is prohibitive.

Further, the individual tubes and associated joints are relatively heavy since the tubes are generally made by the extrusion of or by the rolling and seaming of a metal alloy, and the joints are generally made by welding or brazing these tubes together. The manufacture and assembly of these multiple structural parts is also time consuming and costly.

In addition, most conventional bicycle frame tubes have generally circular cross-sections, since they are made from standard, commercial tubing. Thus, due both to the shape of the tubes and to the multiplicity of connection joints, conventional frames are not particularly adaptable to improved aerodynamics.

Prior efforts have been made to address some of these problems. For example, U.S. Pat. No. 4,513,986 to James Trimble suggests a monocoque type frame having a stressed, unitary outer skin over internal stiffening ribs and other structural elements. U.S. Pat. No. 3,833,242 to Thompson, Jr. discloses a frame having a hard exterior skin covering a structural foam interior. The Thompson frame was constructed by techniques disclosed in U.S. Pat. Nos. 3,268,636 and 3,456,446 to Angell, Jr. A partial listing of other molded frames and/or construction methods includes U.S. Pat. Nos. 3,233,916; 3,375,024; 3,884,521; and 4,015,854; and U.K. Patent No. 1,361,394.

These frames may provide advantages over conventional bicycle frames, due in some instances to increased strength and a reduced number of major structural joints. However, these frames generally require interconnection of a large number of interior structural support elements such as shear webs, reinforcing angles, reinforcing blocks and strips, and joining blocks, and/or the presence of structural foam in the interior to support the frame, thus sharing certain deficiencies with conventional frames. In addition, the construction methods employed therein are labor intensive and do not appear readily adaptable to efficient mass production.

The above problems may be remedied by a generally hollow bicycle frame made from resin and fiber composite materials as described hereinbelow. This frame may be constructed from lightweight, strong and relatively inexpensive composite materials, and there also is described a method for producing such a bicycle frame.

SUMMARY OF THE INVENTION

The present invention provides improved generally hollow cycle frame components each defined by a substantially unitary wall and a method of making these frame components from composite materials. The method makes it relatively easy and economical to construct a bicycle frame of composite materials, and is adaptable to mass production techniques. Preferably, a composite material comprising a heat curable synthetic resin reinforced with structural fibers is chosen so as to provide great strength combined with light weight. The cycle frame components advantageously combine a lightweight structure with an aerodynamic shape that substantially reduces aerodynamic drag. The invention therefore provides an unusually light (ultra-light) bicycle frame of generally hollow tube-like construction having unexpected strength and durability and low aerodynamic drag.

Bicycle frames which may be constructed in accordance with the methods of the present invention include those with open front and rear triangles, and those with one open and one closed triangle. Bicycle frames having other shapes and components, such as non-triangular or solid frame shapes, also may be constructed in accordance with these methods. Such frames are strong and lightweight and may be made as one unitary piece which is easy to construct and adaptable to mass production techniques.

Each unitary frame assembly or unitary frame component comprises a unitary wall molded from composite materials to produce a generally hollow frame structure which does not require internal structural components within its interior cavity. The unitary wall includes at least one molded juncture wherein corresponding edges of at least two sections of resin impregnated fabric have been overlapped and then molded together to provide a substantially continuous wall defining the hollow interior cavity of the frame assembly or frame component. A completely unitary bicycle frame may have generally hollow portions corresponding generally to the tubular members of a conventional bicycle frame and comprise a top tube portion, a down tube portion, a seat tube portion, a right and a left chain stay portion and a right and a left seat stay portion, all constructed using a structural fiber and resin composite. The structural fibers are preferably unidirectional and may include carbon fibers, glass fibers, polyethylene fibers or other reinforcing fibers usable to make composite materials, or combinations of these fibers.

The top tube portion, down tube portion and seat tube portion generally define an open front triangle. A common hollow junction joins the down tube portion and the top tube portion and contains a steering support means including a head axle engaging element. A common hollow junction joins the seat tube portion and the top tube portion and contains a seat support means including a seat post engaging element. A common hollow junction joins the down tube portion and the seat tube portion and contains a pedal support means including a pedal axle engaging element. A right rear wheel support means may be provided in a common junction joining the right seat stay portion and the right chain stay portion, and a left rear wheel support means may be provided in a common junction joining the left seat stay portion and the left chain stay portion. These stay portions and the seat tube portion generally define an open rear triangle. The right and left rear wheel support means each include a rear wheel axle engaging element. The common junctions between the seat and chain stay portions are optional and these portions may instead be joined by the respective right and left rear wheel axle engaging elements, such as by right and left rear wheel dropouts having a pair of legs one for connection to each stay portion.

Each support means may each comprise a sleeve or other insert. Therefore, the front and rear triangles together form a bicycle frame which joins a sleeve for supporting the head axle, a sleeve for supporting the pedal crank axle, a sleeve for supporting the seat post and a pair of dropouts for supporting the hubs of the rear wheel assembly. The front and rear triangles may be visually open from the side. However, these open triangles also may be covered with an aerodynamic skin which may appear similar to the skin of a conventional monocoque bicycle frame. However, such a skin over an otherwise open frame made according to the present invention would not carry the stress loading of a monocoque skin.

A principal object of the invention therefore is to provide a method of making a unitary, ultralight, generally hollow bicycle frame requiring no internal structural components. The frame preferably comprises a steering support means, a seat support means, a pedal support means, a rear wheel support means, a top tube portion, a down tube portion, a seat tube portion, a pair of chain stay portions, and a pair of seat stay portions, constructed using layers of heat curable resin filled with reinforcing fibers. In the various embodiments, the cross-sectional shape of selected portions of the frame may be altered, depending upon the position of the portion, to improve the aerodynamic behavior of the frame, without an attendant increase in cross wind sensitivity.

The bicycle frame of the invention most preferably is a unitary frame structure of integrally united tubular frame portions and hollow junction portions. In this specification, "integrally united" means that a first piece of resin impregnated fabric was placed in overlapping contact with a second piece of resin impregnated fabric and that at least one of the first and second pieces was cured by a substantial amount after being so overlapped. Preferably, both the first and second layers are cured by a substantial amount after being so overlapped. The amount of the overlap is at least about ¼ inch, preferably at least about ½ inch, and more preferably at least about 1 inch. Each piece of fabric comprises one or more layers of fibers, preferably substantially continuous unidirectional fibers. Where multiple layers of unidirectional fibers are used, the fibers in different layers may be oriented longitudinally in different directions.

"Meldedly bonded" means an uncured portion or junction is integrally united to an uncured junction or portion, respectively, during the molding process. "Moldably bonded" means an uncured portion or junction is integrally united to a cured junction or portion, respectively, during the molding process. "Adhesively bonded" means a cured portion or junction is joined to a cured junction or portion, respectively, by a layer of an adhesive composition, which was applied in an uncured state and then cured to perfect a joint between the two previously cured components.

To provide a totally unitary frame structure, the connection between each of the tubular portions comprises a hollow common junction. Thus, a hollow common junction is provided between the tubular top tube portion and the tubular down tube portion and carries the head tube sleeve. Another hollow common junction is provided between the tubular down tube portion, the tubular seat tube portion and the pair of tubular chain stay portions and carries the bottom bracket sleeve. A further common hollow junction is provided between the tubular top tube portion, the tubular seat tube portion and the pair of tubular seat stay portions and carries the seat post sleeve. Still further hollow common junctions are provided between each tubular chain stay portion and the corresponding tubular seat stay portion and carry the corresponding slotted rear wheel dropouts, one on either side of the rear wheel assembly.

In this specification, the hollow junction common to the top tube portion and the down tube portion is designated the head junction, the hollow junction common to the top tube portion and the seat tube portion is designated the seat junction, the hollow junction common to the seat tube portion and the down tube portion is designated the bottom bracket junction, the hollow junction common to the right chain and seat stay portions is designated the right stay junction, and the hollow junction common to the left chain and seat stay portions is designated the left stay junction. The right and left seat stay portions are joined to the top tube and seat tube portions by the seat junction and the right and left chain stay portions are joined to the down tube and seat tube portions by the bottom bracket junction.

While a totally unitary frame of only integrally united components is most preferred, it is contemplated that each of the tubular portions and each of the common junctions may be made separately and then fastened together into an assembled structure by other than integrally uniting means, such as by adhesively bonded stub joints. Preferably, at least one tubular portion and at least one hollow junction are formed together and integrally united to provide a unitary frame assembly. More preferably at least two tubular portions with one hollow common junction therebetween or at least two hollow junctions with one common tubular portion therebetween are formed together and integrally united to provide a unitary frame assembly. For example, the tubular portions forming the front triangle of the frame may be integrally united to form a unitary frame assembly having a hollow common junction between the top tube portion and the down tube portion, a hollow common junction between the down tube portion and the seat tube portion, and a hollow common junction between the top tube portion and the seat tube portion. Similarly, the bicycle frame may comprise an integrally united unitary rear triangle assembly having a hollow common junction between the seat tube portion and the pair of chain stay portions, a hollow common junction between the seat tube portion and the pair of seat stay portions, and a pair of hollow common junctions, one between the chain stay portion and the seat stay portion on one side of the rear wheel assembly and the other between the chain stay portion and the seat stay portion on the opposite side of the rear wheel assembly.

The foregoing unitary frame components and assemblies are made preferably of a fabric impregnated with a moldable synthetic resin. The synthetic resin is preferably an epoxy type resin with a heat activatable hardener component. Such fiber and synthetic resin material in the uncured state is commonly referred to as "prepreg". The fibers may be either woven or unwoven fibers, unidirectional unwoven fibers being preferred, and preferably are arranged in multiple layers. Different layers may have different types of fibers and/or fiber compositions. One composition of the fibrous material may comprise one-third glass fibers, one-third Kevlar 49 fibers, and one-third carbon fibers. "Kevlar" is a registered trademark of DuPont for its proprietary aromatic polyamide fibers. Spectra fibers, which are made of polyethylene and are available from the Allied Fibers Division of Allied Signal, Petersburg, Va., also may be used.

In fact, a wide range of different fiber mixtures may be selected, depending upon the specific performance characteristics desired, which include stiffness, compliance, tensile strength, compressive strength, vibration dampening and the like. One preferred shell composition is where an outer layer (called a "scrim") of glass fibers provide hoop strength by surrounding inner layers containing substantially all carbon fibers of the medium modulus type. To the carbon fibers may optionally be added small amounts of boron and/or Kevlar 49 fibers, such as 1% of each relative to the weight of carbon fibers. Another preferred shell composition comprises inner layers containing about 40% Spectra fibers and about 60% carbon fibers, both of the high modulus type, and an outer scrim of glass fibers. In these compositions, the glass fibers comprise about 10% of the total weight of fibers.

A preferred method of molding the unitary frame structure of the invention employs a female molding unit having three mold pieces, namely, a right side piece, a left side piece and a rear piece. The right and left side mold pieces have molding cavities corresponding to the outline of the geometry of the frame as viewed from the right and left sides, respectively. The third piece of the mold has a molding cavity corresponding to the rear wall of the seat tube portion and the inside opposing walls of the pairs of chain stay portions, seat stay portions, and dropout junctions. To further facilitate assembly and/or disassembly, the rear mold piece may comprise three sub-sections bolted together to form a composite rear piece. Thus, the rear mold piece may comprise a long and narrow apex section extending vertically along the rear of the seat tube chamber and bolted between right and left side sections.

In molding the frame, one or more continuous pieces cut from a sheet of resin impregnated fabric may be laid up in each of the mold pieces, a total thickness of about 30 to about 60 mils being preferred, and about 45 mils being most preferred. In laying up the prepreg pieces for each frame part, preferably about ¼ to about 1 inch, more preferably about ½ inch to about ¾ inch, of each piece of impregnated fibrous material extends beyond the edges of the cavity of one of the main mold pieces, preferably the bottom piece, so as to provide the excess material needed to form an integral longitudinal connection of about the same width by overlapping adjacent longitudinal edges of the piece or pieces of prepreg material when the mold pieces are assembled while the resin is still tacky and substantially uncured. Similarly, integral transverse connections between uncured parts of the prepreg lay-up, such as the respective parts for forming a tubular portion and a hollow junction, are formed by overlapping adjacent transverse edges of the pieces of prepreg material by about ½ to 5 inches, preferably ¾ to 3 inches, more preferably 1 to 2 inches.

It is believed that at least about ¼ inch of overlap between the longitudinal edges of two uncured elongated strips of prepreg, and at least about ½ inch of overlap between the transverse ends of such strips and the transverse ends of corresponding junction patches, will yield upon curing under pressure a structural continuity of unidirectional fibers within and across the resulting juncture. This continuity provides a sufficiently integral structure to transfer stress loadings from fiber to fiber across overlapped pieces of the fibrous prepreg material. In order to obtain such stress transfer between overlapped transverse ends of an uncured piece of prepreg and a previously cured component made from the same prepreg, the overlap is increased by about 10%, preferably by about 25%, so that there is at least about 0.55 inch of overlap, preferably at least about 0.625 inch of overlap. Such stress transfer is highly desirable because carbon fibers and the like are capable of carrying much greater (by a factor of as much as 10 to 30) tensile stress loadings than the resins with which they are impregnated. Thus, the overlapped edges upon curing provide integrally united and substantially continuous molded frame walls which bridge the joints between the respective mold pieces. In their uncured state, the overlapped edges and ends of the uncured pieces provide an expansion means for allowing free expansion of the frame shell so that all exterior areas of its walls can be firmly pressed against the walls of the mold and into any recesses therein by a pressing means during the resin curing step.

The overlapping edges of prepreg bridging the lines of abutment of the mold pieces may be pressed together by running a rod or other tool down each preformed shell section before it is transformed by curing into the corresponding tubular portion or junction. However, this is preferably accomplished by a pressing means for continuously applying internal pressure to the frame shell throughout the curing operation. One such continuous pressing means is one or more appropriately shaped bladders which are pressurized with air after the entire bicycle frame shell has been laid up and the mold pieces have been fastened together to form a composite frame molding unit. Another continuous pressing means is a foamable resin composition. Such resin compositions are available in solid, liquid or paste forms. Improvements in the performance characteristics of composite bicycle frames resulting from this molding process are believed to be due, at least in part, to intimate contact between the fibers of the respective overlapped edges of one or more continuous pieces of prepreg material. This intimate contact is achieved by the continuous pressure which is applied to the overlapped edges as they are cured during the molding process to provide a molded juncture.

Where unidirectional fibers are used for the top tube portion, the down tube portion and the stay portions, about one-fourth to about one-half of these fibers are positioned at an angle between 0° to 45°, preferably about 20° to 45°, more preferably about 30°, relative to the longitudinal axis of these elongated tubular portions, with the remaining fibers being generally parallel to this longitudinal axis. Such orientation of the unidirectional fibers is believed to improve the strength of these members for carrying bending and torsional stresses. Although the unidirectional fibers are preferably parallel to the longitudinal axis when used as reinforcing in the elongated seat tube portion, these fibers also may be placed at angles between 0° and 45°, such as 20°, 30° or 45°, relative to the longitudinal axis of this member, depending on the strength characteristics desired.

Where seat or chain stay portions of relatively small diameter are desired, these tubular frame portions may be further reinforced for carrying high stress loads by providing a substantially rigid core of synthetic resin within the hollow tube interior. A pressing means capable of also providing such reinforcement may comprise a heat expandable styrofoam or polyurethane foam, the latter being preferred because of its resistance to heat and to degradation by petroleum type chemicals. Such internal reinforcement also may be provided by placing within the hollow interior of the tubular stay portions a rigid plastic core of unexpandable resin, preferably a light weight foam, surrounded by a solid or liquid expandable layer or sleeve, such as may be formed from a heat expandable adhesive composition available in the form of a viscous paste or a solid sheet or strip. This adhesive composition is expanded and cured in place so as to substantially fill that part of the hollow interior of the tubular stay portion between its interior surface and the exterior surface of the rigid plastic core.

The advantage of a substantially rigid core of synthetic resin within a tubular stay portion is that the wall thickness of the hollow stay may be reduced by as much as about thirty percent (30%) of the wall thickness without a resin core. For example, a tubular stay of resin impregnated fiber with a wall thickness of about 60 mils has about the same strength as a tubular stay of the same material with a wall thickness of about 42 mils and filled with a substantially rigid core of synthetic resin.

Each of the vertically extending tubular portions of the frame, such as the down tube, seat tube and seat stay portions, preferably have a non-circular aerodynamic cross-sectional shape. This aerodynamic cross-sectional shape preferably is symmetrical and extends along a major portion of the length of the elongated tubular portions, more preferably over substantially the entire length thereof. The preferred aerodynamic shapes of the seat tube and down tube portions are substantially symmetrical relative to an imaginary plane in which both the front and rear wheels rotate, preferably the plane passing through substantially the center of the geometric cross-sectional shape of the tire carried by the wheel assembly.. The top tube portion also is preferably symmetrical to this imaginary plane, and may have a circular or non-circular aerodynamic cross-sectional shape.

In the preferred aerodynamic shapes for the top tube portion, the down tube portion, and the seat stay portions, the outer surfaces of these portions are preferably substantially parallel. On the other hand, at least a part of the rear surface of the seat tube portion preferably follows the radius of curvature of the circumference of the rear tire carried by the rear wheel assembly. The leading edge of the seat tube portion is preferably straight. The outer surfaces of the tubular chain stay portions preferably taper rearwardly with reference to both the "x" and "y" axes of a plane transverse to the longitudinal axes of these portions. This taper, the fiber and resin composition of the tubular stay wall and the resin composition of the core (if left in place) are selected to achieve the desired degree of compliance in the chain stays.

The head axle engaging, seat post engaging, pedal axle engaging and rear wheel axle engaging elements may be molded as parts of the frame body from the same or similar materials as the frame body, or may be separately made plastic or metal inserts attached to the frame body, preferably by integrally molding the frame body around these separate pieces.

Preferably, a metal tube or fitting is placed in each common hollow junction as a part of the support means to receive and support the appropriate bicycle component in the finished bicycle. Thus, the seat support means includes a metal seat post sleeve, the steering support means includes a metal head tube sleeve, each rear wheel support means includes a metal dropout, and the pedal support means includes a metal bottom bracket sleeve. In this specification, the term "hollow junction" includes that portion of the unitary bicycle frame which joins adjacent ends of two corresponding tube or stay portions and which has at least part of its wall surrounding at least part of the corresponding one of the aforesaid support means. Substantial portions of the junction walls preferably abut and adhere to substantial portions of the corresponding sleeve wall.

The major tubular portions of the front triangle, which are the seat tube portion, the down tube portion, the top tube portion, and the hollow junctions therebetween, may be formed by layering strips of resin impregnated fiber as they are laid up in the respective cavities of the mold pieces while they are separated. The lay-up in at least one mold half is such that an excess of prepreg material extends around the mold cavity beyond its edge. When the desired wall thickness is obtained, the separate mold pieces are brought together in opposing relationship to define the molding chamber(s) and to cause overlapping of the excess edge material. This provides two longitudinal connections between overlapped edges of the two laid up halves of the frame shell. An alternative way of making the frame shell is to layer longitudinally folded strips of prepreg around a solid mandrel shaped to be the approximate size and shape of the desired hollow volume within the finished tubular portion. This requires only one longitudinal connection between overlapped edges in a region opposite to the region of the longitudinal fold. Longitudinally folded strips of prepreg may be laid up similarly in a mold.

Because of their small inner diameter, it may be desirable to form the minor tubular portions, which are the chain stay portions and the seat stay portions, by layering resin impregnated fabric around solid foamable cores shaped to be the approximate size and shape of the desired hollow volume within the finished stays. The minor portions may be united to each other outside of the mold with prepreg patches to create stay junctions between these portions. Alternatively, the rear ends of the minor portions may be united to each other outside of the mold by an intermediate rear wheel support member, such as a dropout secured to the rear ends of a chain stay and a seat stay respectively. The minor portions then may be connected in the main mold to the seat junction and the bottom bracket junction of the front triangle, thereby forming a pair of rear triangles with the seat tube portion.

Sufficient layers of fiber and resin are laid up in the mold or around a mandrel or core to achieve a cured front triangle wall thickness of from about 30 mils to about 125 mils, preferably about 35 to about 50 mils, more preferably about 40 to 45 mils, and a cured stay wall thickness of about 7 to about 80 mils, preferably about 10 to 60 mils, more preferably about 30 to about 40 mils, most preferably about 37 mils. The wall thicknesses of different tubular portions, such as the seat stays versus the chain stays, may be different depending upon the desired performance characteristics of each. For example, the seat stays may be thinner than the chain stays, and therefore may have greater compliance, to improve rider comfort.

The preferred metal tubes and dropouts are wrapped into the front and rear triangle junctions during the formation thereof by using scrims, which comprise strips or patches of resin impregnated fabric wrapped tightly around the insert. Runs of semi-rigid tubing are also preferably inserted in the lay-up of the frame shell, so as to extend from an inlet fixture to an outlet fixture. These tubing runs are preferably made of 3/16 inch O.D. Nylon tubing and serve as housings for the cables that operate the gears, sprockets and brakes of the bicycle. Following the laying up of a complete frame shell containing all of the desired inserts, the mold, preferably a three-piece mold having an interior chamber which is the same size and shape as the exterior of the finished bicycle frame, is assembled and prepared for heat curing the frame.

In order to compress the layers of resin and fiber against the inside surfaces of the mold and into any mold recesses, such as those for forming bosses and fairings for mounting bicycle hardware, pressing means is provided for exerting pressure against the inside of the hollow shell of composite material while it is being heat cured to form the frame. As previously indicated, the overlapped longitudinal edges and transverse ends of the hollow shell lay-up provide an expansion means allowing the walls of the uncured frame shell to expand fully so that all surface areas of the shell are firmly and uniformly pressed against abutting inside surfaces of the mold. If sufficient pressure is not exerted or if free expansion of the shell in response to this pressure is not allowed, the cured frame may be defective in that it may not have the necessary structural strength, the desired exterior shape, and/or the desired continuous and uniformly smooth surface finish.

For the major tubular portions and junctions of the front triangle, inflatable bladders may be inserted as pressing means in the relatively large hollow interiors of these components and then inflated from outside of the mold before and during the curing stage in order to fully expand the shell and compress the layers of composite material making up these components against the inner surface of the mold. For the tubular stay portions, the pressing means may be a foamable core material which expands on heating to provide sufficient pressure for forming these portions and their common junctions and integrally uniting them with the front triangle to form a unitary frame structure. The foamable core material may be one piece or an inner non-expandable core piece coated or wrapped with a liquid or solid outer piece which is a heat expandable adhesive. An expandable film adhesive of this type is available from Ciba-Geigy of Fountain Valley, Calif. under the tradename R-370B. Alternatively, a foamable liquid resin may be used in place of all or part of the bladders, the solid foamable core or both.

Alternatively, each major and minor tubular portion may be formed on an appropriately shaped mandrel and then pulled off the mandrel, filled with a pressing means and placed in the mold. The pressing means may be an appropriately shaped bladder or a liquid, paste or solid foamable resin core. The pressing means is thereafter activated with the assembled shell in the mold to compress the uncured components of the shell against the inside of the mold. As further alternatives, the minor tubular portions may be laid up and compressed in the mold in the same manner as the major portions, or the major tubular portions may be wrapped longitudinally or spirally around heat expandable solid cores in a manner similar to that preferred for the minor portions.

Accordingly, one embodiment of the present invention provides a method for manufacturing unitary, generally hollow ultralight bicycle frames in which the structural fibers and impregnating resins may be initially shaped around mandrels having the approximate size and shape of the hollow interior of one or more finished tubular portions of the frame. After this initial lay-up, these hollow portions are removed from the mandrels, filled with a pressing means, and then are united to form an uncured frame shell by using hollow corner patches comprising multiple layers of fiber strips and resin. This uncured frame is thereafter placed in a mold and cured as herein described.

In their deflated condition, bladders substantially follow the general outline of the geometry of the bicycle frame and may be placed in the lay-up of the shell within the bottom side piece of the mold prior to its assembly with the other mold pieces. After the mold pieces are assembled and secured together by appropriate fasteners, the bladders are pressurized with air or other gases so as to press the overlapping segments firmly together and the frame material as a whole firmly against adjacent surfaces of the mold. When the bladders are inflated, they together assume substantially the same shape and geometric outline as the desired unitary bicycle frame, except their dimensions are of the smaller size required to fit within the hollow interior of the frame shell. The resin portion of the frame material thereafter is cured with the bladders pressurized. This provides a bicycle frame with a substantially continuous wall comprised of resin and layered reinforcing fibers. This wall extends integrally and smoothly across the mold junctures where the mold pieces are in abutment.

Access to the bladders may be obtained through a necessary opening in the bicycle frame, such as that for receiving the head tube sleeve, the seat post sleeve or the bottom bracket sleeve. Thus, separate bladders may be placed in each major portion, with each bladder exiting from one end of the passage in each junction for receiving a corresponding sleeve. For example, the bladder in the top tube portion could exit from the passage which is provided in the head junction for the head tube sleeve, the bladder in the down tube portion could exit from the passage which is provided in the bottom bracket junction for the bottom bracket sleeve, and the bladder in the seat tube portion could exit from the passage which is provided for the seat post sleeve. When each of the sleeve inserts are to be fixed in place during molding of the frame, this may be accomplished by using a sleeve insert with a single transverse hole located so as to pass a bladder inlet extension, preferably without causing it to traverse a bend of more than 90° as it exits the frame axially along the inside of the sleeve insert.

Although the foregoing bladder arrangements will operate satisfactorily, it may be desirable to reduce the number of bladders because pressure may not be applied evenly in the common junctions where discontinuous bladders abut each other. In addition, a bladder exiting from the bottom bracket sleeve or its receptacle, or from the head tube sleeve or its receptacle, must follow a somewhat tortuous path and may be subjected to being bent at an angle sufficiently sharp to expose the bladder membrane to collapse or kinks that can cause rupture when the bladder is inflated. Accordingly, means may be provided for reducing the number of bladders required for compressing the composite bicycle frame shell, and for eliminating sharp angles where the bladder(s) exits at the head junction or bottom junction.

A method therefore is described in which at least one inflatable bladder inside an uncured frame shell is accessed through a special passageway through a common hollow junction. The hollow junction may contain the pedal axle support means or the steering axle support means. The special passageway preferably is substantially straight so as to permit the bladder to be inflated and, if desired, later removed in a generally straight line, thereby reducing the possibility of kinking and bladder rupture during inflation. A substantially straight passageway requires an outer opening from the exterior of the frame into the common hollow junction. This outer opening may, if desired, be patched or otherwise covered in the finished bicycle frame. The corresponding bladder may be removed or left in place since it is extremely light in weight.

Two inflatable bladders are preferably provided to apply the necessary compression to the front triangle of the frame. One of these bladders can be routed through a special passageway in a bottom bracket junction containing a bottom bracket sleeve and into and along either the down tube portion or the seat tube portion, and then along the top tube portion. As alternatives to this embodiment, a head junction containing a head tube sleeve may be provided with a special passageway for the inflation and, if desired, later removal of an inflatable bladder in a generally straight line aligned with either the top tube portion or the down tube portion of the front triangle. For aesthetic reasons, the outer opening from the exterior of the frame into this head junction passageway is preferably patched or otherwise covered in the finished bicycle frame.

The passageway through the bottom bracket junction may be in substantial alignment with either the down tube portion or the seat tube portion, and the passageway through the head tube junction may be in substantial alignment with either the down tube portion or the top tube portion to avoid a sharp angle bend in the corresponding bladder inlet extension, as would be required if this bladder was routed instead along the axis of the bottom bracket sleeve or the head tube sleeve. The elimination of this bend reduces the possibility of kinking and bladder rupture during inflation. The bladder length and routing thereby may be chosen so as to eliminate routing multiple bladders or one extraordinarily long bladder through a single point of straight line entry, such as the seat tube sleeve. This also reduces the possibility of kinking and bladder rupture.

Most preferably, inflatable bladders are placed in the larger hollows found in the top tube portion, down tube portion, and seat tube portion, and a solid foamable core, which may be made from an unexpandable rigid plastic inner piece surrounded by a heat expandable adhesive resin composition (solid or paste), is provided in the smaller hollows of the seat stay and chain stay portions. The frame shell is then placed in a mold, the bladders are inflated to compress the layers of fiber and resin against the walls of the mold and the curing process is initiated by applying heat to the mold. Further compression of the layers of fiber and resin occurs as the pressure within any bladders and the pressure caused by expansion of any expandable foam cores increases as the temperature rises. When curing is complete, the frame is removed from the mold, and the inflatable bladders may be removed manually and the foamed cores may be removed by dissolution in an appropriate solvent.

In another embodiment, the invention provides a method for manufacturing a generally hollow assembly for an ultralight bicycle frame comprising at least one hollow tubular portion integrally united to at least one hollow junction in a mold. The hollow junction may be part of a main frame section formed and cured independently and then connected to at least one uncured hollow tubular portion during its pressurization and curing. Alternatively, the tubular portion may be part of a main frame section formed and cured independently and then connected to at least one uncured hollow junction during its pressurization and curing. In either case, the uncured component becomes moldably bonded to the main frame section as the uncured component is cured.

When the uncured component and at least an adjacent segment of the precured main frame section have been assembled and enclosed in a mold, the pressing means is activated to compress the uncured layers of fiber and resin firmly against the wall of the mold and against the adjacent segment of the precured main frame section. The curing process is also initiated by applying heat to the mold to heat the assembled frame assembly to a temperature sufficient to cure the resin of the previously uncured component.

For prepreg obtained from the Fiberite Company, the frame shell is preferably heated to about 250° F. to cure the resin. Further compression of the layers of fiber and resin in the shell occurs as the pressure within any bladder used and the pressure caused by expansion of any foamable cores used increases as the temperature rises. Any foamable cores preferably comprise an elongated piece of rigid non-expandable resin foam wrapped with a thin flexible sheet of solid material made of a heat expandable adhesive composition. This adhesive composition is preferred because it foams at the preferred curing temperature of the prepreg, namely, about 250° F. Alternatively, the tubular portions may be formed around a heat expandable solid resin foam, such as a closed cellular structure made from a polymethacrylimide resin available under the trademark Rohacell from Cyro Industries of Orange, Conn. This resin foam is rigid at ambient temperatures, but softens to a plastic state and expands radially by further foaming at temperatures in the range of about 300° F. to 350° F., which may be too hot for some of the frame hardware, such as aluminum dropouts and/or sleeves.

BRIEF DESCRIPTION OF THE DRAWINGS

A better understanding of the invention and its advantages will be apparent from the description below of specific embodiments taken in conjunction with the accompanying drawings in which:

FIG. 1A is a plan view with partial sections of the right side lay-up for a composite bicycle frame in the bottom piece of a mold, and illustrates one example of placement of inflatable bladders in accordance with the invention;

FIG. 1C is a plan view of the right side lay-up for a composite bicycle frame in the bottom piece of a mold, and illustrates one example of the placement of an extra long reinforcing strip of prepreg fabric.

FIG. 4 is a perspective view of a bladder air connector passing through the bottom bracket sleeve in accordance with the embodiment of FIG. 1;

FIG. 5 is a fragmentary sectional view along lines 5—5 of FIG. 4;

FIG. 6 is a plan view of the right side lay-up of a composite bicycle frame in the bottom piece of the mold, and illustrates a modified bottom bracket sleeve arrangement, a modified head tube sleeve arrangement, and corresponding bladder placements in accordance with the invention;

FIG. 7 is a plan view of the right side lay-up for a composite bicycle frame in the bottom piece of a mold, and illustrates an alternatively modified head tube sleeve arrangement and corresponding bladder placements in accordance with the invention;

FIG. 8 is a plan view of the right side lay-up for a composite bicycle frame in the bottom piece of a mold, and illustrates further alternative bladder arrangements that may be used with or without corresponding metal sleeve inserts;

FIG. 9 is a fragmentary plan view of the mold and head tube junction of the frame lay-up of FIG. 1;

FIG. 10 is a fragmentary elevational view in section taken along line 10—10 of FIG. 9;

FIG. 11 is a fragmentary elevational view in section taken along line 11—11 of FIG. 9;

FIG. 12 is a fragmentary elevational view in section taken along line 12—12 of FIG. 9;

FIG. 13 is a plan view of a separately molded chain stay component in accordance with a modification of the invention, FIG. 14 is a fragmentary cross-sectional view of a modified pedal support means with the modified chain stay component of FIG. 13 connected thereto, thereby illustrating an alternative means of connecting chain and seat stays when these components are molded separately from the front triangle;

FIG. 15 is a side elevation view of a frame of the present invention showing a seat assembly and a front fork assembly mounted on the frame;

FIG. 16 is a sectional view of the hollow junction for supporting the seat support sleeve of a frame of the present invention, taken along line 16—16 of FIG. 15;

FIG. 17 is a rear perspective view of a frame of the present invention as seen along line 17—17 of FIG. 15;

FIG. 18 is a sectional view of a frame of the present invention, taken along line 18—18 of FIG. 15;

FIG. 19 is a sectional view of the down tube portion of a frame of the present invention, taken along line 19—19 of FIG. 15;

FIG. 20 is a sectional view of the top tube portion of a frame of the present invention, taken along line 20—20 of FIG. 15;

FIG. 21 is a sectional view of the seat tube portion of a frame of the present invention, taken along line 21—21 of FIG. 15;

FIG. 22 is a sectional view of the junction between the top tube portion and the down tube portion of a frame of the present invention taken along line 22—22 of FIG. 15;

FIG. 23 is a sectional view of the junction between the seat tube portion and the down tube porition of a frame of the present invention taken along line 23—23 of FIG. 15;

FIG. 24 is a sectional view of one of the chain stay portions of a frame of the present invention taken along lien 24—24 of FIG. 15;

FIG. 25 is a fragmentary sectional view of a portion of the junction for supporting the steering assembly in a frame of the present invention taken along line 25—25 of FIG. 15; and, FIG. 26 is a sectional view of one of the seat stay portions of a frame of the present invention taken along line 26—26 of FIG. 15.

DESCRIPTION OF BEST MODE AND OTHER EMBODIMENTS

Figure 2A:
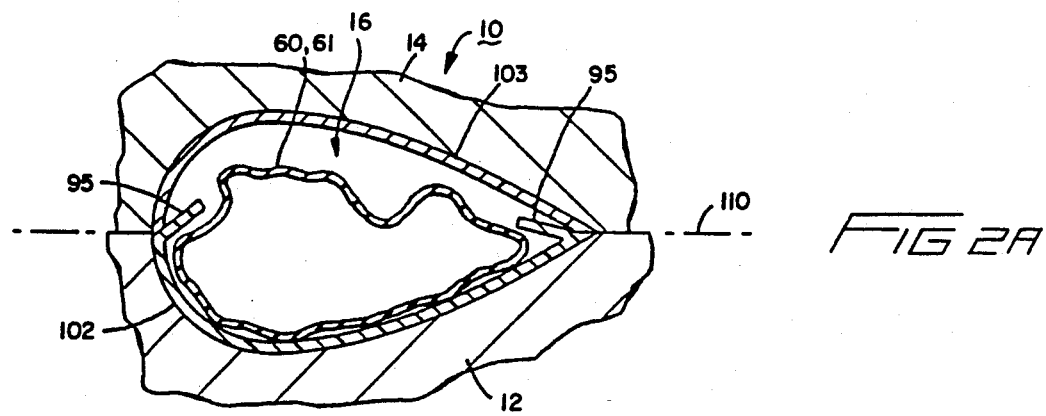
FIG. 2A is a fragmentary transverse sectional view showing a bladder in the down tube portion of a bicycle frame shell with the top and bottom mold pieces in place before inflation of the bladder or curing of the resin in the shell.
Figure 2B:
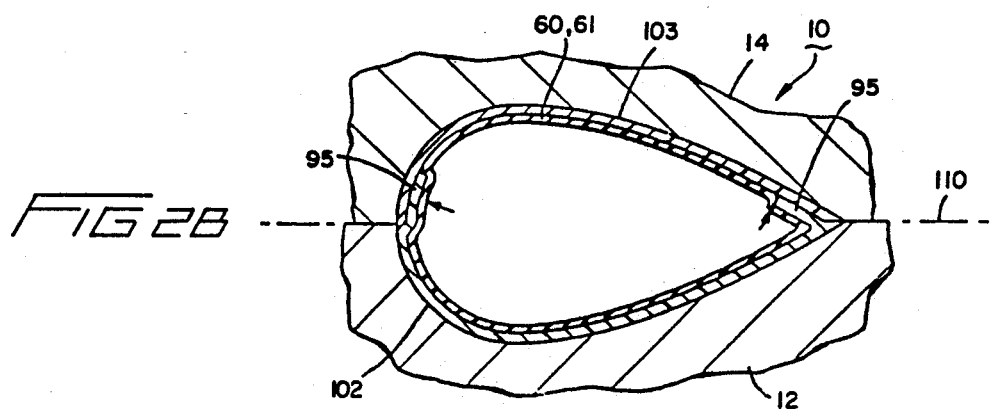
FIG. 2B is a fragmentary sectional view similar to FIG. 2, but in which the bladder has been inflated for curing of the resin in the shell.
Figure 3:
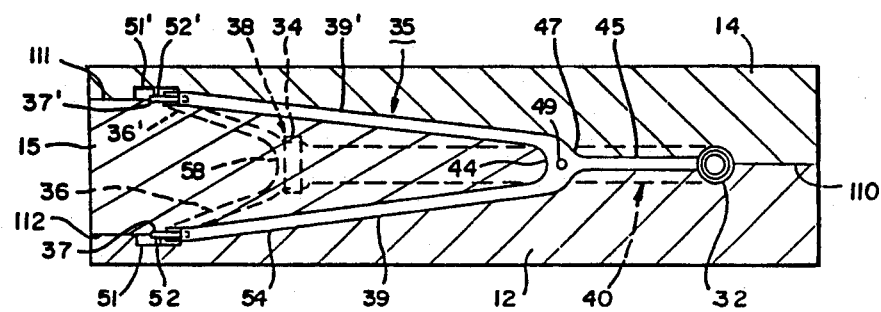
FIG. 3 is a sectional view along lines 3—3 of FIG. 1 with the top, bottom, and intermediate rear mold pieces all in place.

Referring particularly to FIGS. 1-3, there is shown a mold, generally designated 10, having a first or lower piece 12, a second or upper piece 14, and a third or intermediate rear piece 15 (FIG. 3) defining the inner walls of the chain and seat stay cavities which are toward the rear of lower and upper pieces 12 and 14. For clarity, upper piece 14 is not shown in the plan views of FIGS. 1, 6, 7, and 8. However, mirror image of the lower piece 12. Lower mold piece 12 and upper mold piece 14 together define a closed chamber 16 for molding the front triangle of a composite bicycle frame. Lower mold piece 12, upper mold piece 14 and intermediate rear piece 15 together define two closed chambers (not shown) for molding right and left mirror image sections of the rear triangle of a composite bicycle frame.

Both the upper and lower mold pieces have sections corresponding to the portions and junctions of a complete bicycle frame. Accordingly, lower frame piece 12 has a section 20 for molding a head tube portion, a section 21 for molding a top tube portion, a section 22 for molding a seat tube portion, and a section 23 for molding a down tube portion. A junction section 25 connects sections 21 and 23 for molding the head tube junction, a junction section 26 connects sections 21 and 22 for molding a seat tube junction, and a junction section 27 connects sections 22 and 23 for molding a bottom bracket junction. The head tube portion, the top tube portion, the seat tube portion and the down tube portion, together with the interconnecting common junctions, form a generally hollow front triangle for a bicycle frame.

The head tube junction contains a steering support means having a head tube sleeve 30 for rotatably receiving the head axle (not shown) carrying the handle bar assembly and front wheel fork. The seat tube junction contains a seat support means having a seat post sleeve 32 for receiving the post (not shown) of a seat assembly. The bottom bracket junction contains a pedal support means having a bottom bracket sleeve 34 for receiving the pedal axle (not shown).

The complete bicycle frame shell laid up in the lower mold piece 12 includes a rear triangle component, generally designated 35, which connects the rear wheel assembly to the front triangle. As seen best in FIG. 3, rear triangle component 35 includes a right chain stay portion 36 for connecting the right side of the bottom bracket junction 38 with a right dropout 37, a left chain stay portion 36' for connecting the left side of the bottom bracket junction 38 with a left dropout 37', a right seat stay portion 39 for connecting the seat tube junction 40 with the right dropout 37, and a left seat stay portion 39' for connecting the seat tube junction 40 with the left dropout 37'.

Accordingly, the bottom mold piece 12 includes a corresponding outer right chain stay section 41 and an outer right seat stay section 42. The intermediate rear mold section 15 has a wedge-like shape to fit between the right and left side seat and chain stay mold sections as shown in FIG. 3 and provides inner mold walls for the spaced apart right and left side molding cavities which receive the corresponding right and left segments of the rear triangle frame component. The right segment comprises the right chain stay and seat stay portions and the left segment comprises the left chain stay and seat stay portions, respectively, of the bicycle frame. The right and left seat stays come together at 44 and 47 to form a common seat stay piece 45 having an enlarged upper end 46 wrapped into the seat tube junction 40 as described further below. The right and left chain stays are feathered at 57 into bottom bracket junction 38 and are wrapped into this junction so as to be connected by an arch 58.

A junction section 50 of lower mold piece 12 forms a right wheel axle junction 53 for receiving the dropout 37. Lower mold piece 12 includes a recess 51 having a pin 52 for keeping dropout 37 in position during the molding process. Upper mold piece 14 has a similar recess 51' having a pin 52' for keeping dropout 37' in position.

The chain stay portions 36-36' and the seat stay portions 39-39' when connected to bottom bracket junction 38 and seat tube junction 40 make up the rear triangle component 35 which forms a rear triangle with the seat tube portion of the front triangle. In the embodiments shown in the drawings, the chain stay portions and the seat stay portions are formed by either longitudinally folding or spirally winding strips of resin impregnated fabric 54 around solid foamable cores 55 having the same shape and substantially the same size as the interior of the finished stay portions. When the solid foamable cores 55 are heated, they will expand to compress the layers of fabric 54 against the inside surfaces of the corresponding sections of the molding chamber. Alternatively, the stay portions may comprise solid or hollow metal pieces or solid or hollow pieces of pre-cured resin which may be wrapped into the front triangle during the molding process described below, or which may later be secured to the finished front triangle by stub connector joints of the type described below.

Because of their small size, the stay portions are preferably molded around foamable cores, which may be left in place without adding significantly to the weight of the bicycle frame. Because foamable cores are relatively difficult to remove and would contribute significantly to the weight of the front triangle, it is preferable to employ air inflatable bladders 60 and 61 to compress the layers of the front triangle portions and junctions against the corresponding inside surfaces of the mold during heating of the mold for curing the resin.

Referring now to FIGS. 4 and 5, the bladder 60 is connected to an air supply hose 64 by a connector assembly, generally designated 65, having a tubular mandrel 67 passing through a pair of apertures 68—68 in bottom bracket sleeve 34. A conduit like inlet extension 70 of the bladder is in fluid communication with the open end 71 of bladder 60 and passes through the cylindrical passageway on the inside of mandrel 67. The free end 72 of bladder extension 70 is clamped to the outer end of the mandrel by an airline connector 73 having a threaded female coupling 74 for engaging threads 75 on the outside of the mandrel and a conical clamping plug 76 for engaging a correspondingly tapered socket 77. The compression between the opposing conical surfaces of plug 76 and socket 77 securely clamps in place the free end 72 of bladder extension 70 as shown best in FIG. 5. The clamping plug 76 includes a nipple 79 to which the airline 64 is clamped by a conventional hose clamp (not shown), and a bore 80 which provides fluid communication between the clamped airline and the interior of bladder extension 70, which in turn is in fluid communication with the open end 71 of bladder 60.

An O-ring seal 78 is preferably provided in an annular groove in the conical surface of plug 76 to provide a resilient sealing and clamping action between the opposing conical surfaces of plug 76 and socket 77. The free end of the bladder extension 70 may be folded back as shown or may be cut off at the outer edge of socket 77 so as not to pass back over the threads 75. The mandrel 67 includes an annular collar 86 for engaging a corresponding groove in the upper and lower mold pieces to hold the connector assembly 65 in the correct position relative to the molding chamber and bottom bracket sleeve 34. A second connector assembly 65' is used to connect bladder 61 to a second airline 64' through the axial passageway of seat post sleeve 32.

A preferred way of practicing the method of the present invention will now be described with reference to FIGS. 1A, 1B and 1C. Long strips of a composite fabric material comprising multiple layers of unidirectional fibers pre-impregnated with a heat-curable resin are laid directly in the bottom half 12 of the mold to form a top tube lay-up 88, a down tube lay-up 89, and a seat tube lay-up 90. Shorter pieces cut in patterns to provide patches of the composite material are laid directly in the junction sections 25, 26 and 27 of mold piece 12 to form a head tube junction lay-up 91, a seat tube junction lay-up 92, and a bottom bracket junction lay-up 93, respectively. The long tube strips overlap the junction patches by preferably at least about one and one-half inches, more preferably at least about two to three inches, to form a circumferential juncture between each tube end and the corresponding hollow junction.

Figure 1B:
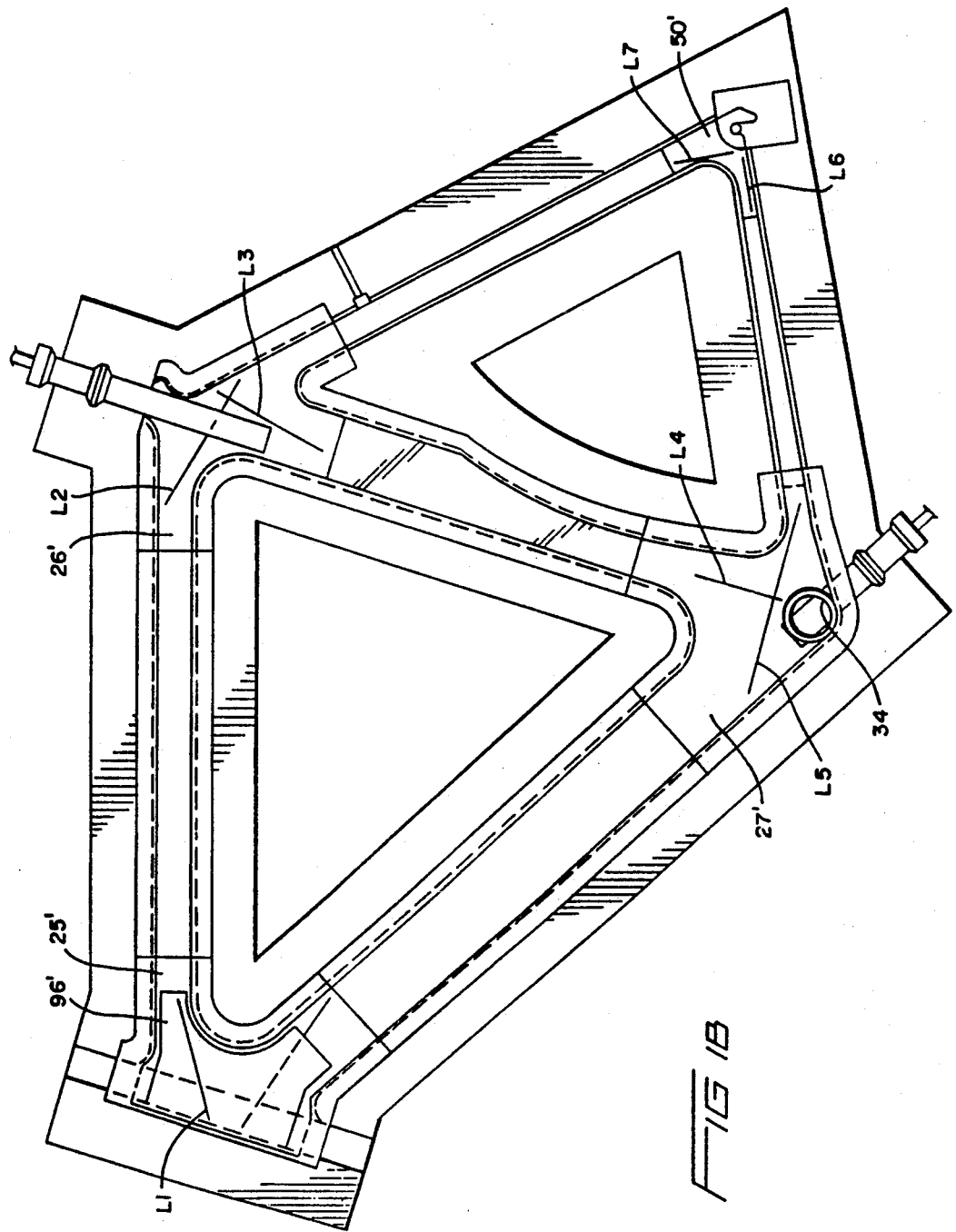
FIG. 1B is a plan view of the right side lay-up for a composite bicycle frame in the bottom piece of a mold, and illustrates one example of the placement of junction patches in accordance with the invention.

FIG. 1B illustrates patterns for a head junction patch 25', a seat junction patch 26', a bottom bracket patch 27', and a rear axle patch 50'. These patches overlap the corresponding tube lay-ups, and may be either inside of the tube lay-ups as shown or outside of these lay-ups. The tube lay-ups may extend 4 to 5 inches into the patch, preferably all the way to the corresponding metal sleeves. Each of the patches is cut as a continuous piece from a larger sheet of the prepreg fabric, and the pattern is preferably cut such that when the patch is arranged in the corresponding junction of the mold, as many as practicable of the unidirectional fibers will extend continuously for the greatest distance practicable across the dimensions of the junction. The longitudinal direction of the unidirectional fibers in at least one layer thereof is indicated by line L1 within head junction patch 25', lines L2 and L3 in seat junction patch 26', lines L4 and L5 in bottom junction patch 27', and lines L6 and L7 within rear axle junction patch 50'. The paired lines L4–L5, L6–L7 and L2–L3 also indicate that it may be desirable to have patches with multiple layers of fibers wherein the fibers in different layers extend longitudinally in different directions to increase the structural continuity of fibers within and across the junction.

To provide such structural continuity of fibers in the head junction, head junction patch 25' is preferably provided with a flap-like extension 96' which extends the junction patch in the lower mold piece entirely around head sleeve tube 30 and back over end portions of the top tube lay-up 88 and the down tube lay-up 89. After fluid bladders are placed in the lower mold piece 12 as described hereinbefore, the extension flap 96' is draped over the portion of the bladder 60 passing through the head junction. When the upper mold piece is in position and the bladder 60 is inflated, extension flap 96' is pressed upward against the corresponding lay-ups in the upper mold piece, similar to the manner in which the overlaps 95—95 of the lower frame half are pressed upward against the upper frame half as shown in FIG. 2B.

This method of laying-up and overlapping individual pieces of the unidirectional composite material and then molding the overlapped edges together while under heat and pressure yields a bicycle frame structure which is made up of substantially continuous fibers. By having the unidirectional fibers of the tube portions overlapping the unidirectional fibers of the junction patches by at least one inch, more preferably at least one and one-half inches, and most preferably at least two to three inches, there is sufficient bonding area and intimate contact between the tube fibers and the junction fibers for the loads sustained by the resulting composite bicycle frame to be transferred from one tube portion through the junction to the other tube portion(s) connected to the same common junction, without significant stress or load concentrations which otherwise may cause excessive compliance characteristics or complete failure of a frame component.

Although not required for many applications, these circumferential junctures may be reinforced by extra long strips of composite material which may run entirely across each junction lay-up from an intermediate or opposite end part of the tube portions on opposite or orthogonal sides of the junction lay-up. For example, as shown in FIG. 1C, a long reinforcing strip 97 may extend continuously from the bottom bracket sleeve 34, along the down tube lay-up 89, around the head tube sleeve 30, along the top tube lay-up 88, around the seat post sleeve 32, and along the seat tube lay-up 90 so as to return to a position adjacent to the bottom bracket sleeve 34 within the bottom bracket junction. In FIG. 1C, the longitudinal direction in which the unidirectional fibers of at least one layer extend is indicated by the solid line L8, which in this example extends parallel to the longitudinal axis of each of the tube lay-ups. Thus, the reinforcing strip of prepreg material has a first leg 97a extending longitudinally along down-tube lay-up 89, a second leg 97b extending longitudinally along top tube lay-up 88, and a third leg 97c extending longitudinally along seat tube lay-up 90. To facilitate bending the strip 97 around the bends at each junction, the resin material may be cut longitudinally many times to form a plurality of small slits each between adjacent continuous unidirectional fibers.

In the embodiment shown in FIG. 1C, the run 97a would be positioned under bladder 60, run 97b would be positioned over bladder 60, and run 97c would be positioned over bladder 61. In these positions, run 97a would be pressed downward against the lower mold piece 12 and runs 97b and 97c would be pressed upward against upper mold piece 14 upon inflation of the corresponding bladders. Alternatively, reinforcing strip 97 may be placed so that run 97a is over bladder 60, run 97b is under bladder 60 and run 97c is under bladder 61. As a further alternative, run 97c may be wrapped partially around seat tube post sleeve 32 so as to be on the opposite side of its corresponding bladder from the position of run 97b.

A similar run of a reinforcing strip (not shown) may be placed around the rear triangle, which comprises the seat and chain stay lay-ups and the seat tube lay-up. Where such a long run of the reinforcing strip is not practicable, shorter runs of separate reinforcing strips may be used, such as a first strip running from an intermediate point within the down tube through the head junction to an intermediate point within the top tube, a second strip running from an intermediate point within the top tube through the seat junction to an intermediate point within the seat tube, and a third strip running from an intermediate point within the down tube through the bottom bracket junction to an intermediate point within the seat tube. The respective ends of each separate reinforcing strip preferably extend past each overlapped juncture between tube and junction and into the corresponding tube portion by preferably at least about one and one-half inches, and most preferably about three to about five inches.

Corresponding left side strips and patches, which are not shown, are laid-up in the top mold half 14 to provide corresponding left side lay-ups for the top tube portion, the bottom tube portion, the seat tube portion and the connecting junctions which will form the left side of the frame when the mold pieces are brought together. The width of the strips and patches in the upper half 14 of the mold are about equal to half of the circumference of the correspondence finished frame portion, while the width of the strips in the lower half 12 of the mold are cut wider to allow for overlaps 95—95 around the inner and outer perimeters of the molding cavity. These overlaps unite the two halves of the front triangle component and the front and rear triangle components when the three pieces of the mold are brought together.

Metal inserts are then placed in lower mold piece 12 to provide the head tube sleeve 30, the seat post sleeve 32, and the bottom bracket sleeve 34. Prior to emplacement, these metal inserts may be wrapped in a patch or strip of composite material, called a scrim. The prewrapped rear triangle component also is laid in place in bottom mold piece 12. At this time, a cable housing 81 of 3/16 inch Nylon tubing is run from a fairing molding recess 82 in down tube mold section 23 to a fairing molding recess 83 in chain stay mold section 41. These recesses may contain small pins for retaining the cable housing ends in position and for providing an access hole in the molded fairings formed thereby. The fluid bladders 60 and 61 are then placed in lower mold piece 12, the extension 70 of the longer bladder 60 being connected to airline 64 through the bottom bracket junction passageway provided by connector 65, and the extension 70' of the shorter bladder 61 being connected to airline 64' through the seat junction passageway provided by connector 65'.

After the fluid bladders are placed in the lower mold piece having the wider strips of material and wider patches, the overlaps 95 on each side are draped over the bladder as shown in FIG. 2A before the mold pieces are joined. Also before the mold pieces are joined, the seat ends of seat stay portions 39 and 39' are wrapped by the overlapping portions of seat junction patches, such as patch 98, and the bottom bracket ends of chain stay portions 36 and 36' are wrapped by the overlapping portions of bottom bracket patches, such as patch 99. Similarly, the various sleeves are wrapped into their corresponding junctions, such as illustrated by patch 96 shown folded over head tube sleeve 30 in FIG. 1.

Following the insertion and overlapping of the bladders and the insertion and wrapping in of the sleeves and the chain and seat stay portions, the mold 10 is closed along lines of abutment 110, 111 and 112 and the mold pieces 12, 14 and 15 are clamped tightly together. The bladders 60 and 61 are then inflated to a pressure in the range of about 15 psig to about 500 psig, more preferably about 100 psig to about 200 psig, to compress the layers of uncured fiber reinforced resin against the interior surfaces of the mold as shown in FIG. 2B. Mold 10 is then heated to and kept at the temperature and for the period of the time recommended by the manufacturer to expand the foamable cores and completely cure the resin of the composite shell material. Thus, as shown in FIG. 2B, the pressure exerted by bladders 60 and 61 compresses the overlaps 95—95 of the lower frame half 12 against the upper frame half 14, integrally connecting and sealing together the right and left sections 102 and 103, respectively, of the frame shell as the composite material of this shell cures within the mold.

Compression of the layers of composite material wrapped around the chain stay portions 36 and 36' and the seat stay portions 39 and 39' against the interior surfaces of the mold also will occur during heating of the mold due to the expansion of foamable cores 55. Following completion of the cure, mold 10 is opened, the bladder connectors 65 and 65' are disconnected and removed, and the finished bicycle frame is removed from the mold. This removal of the frame from the mold is preferably done while the mold is still relatively warm (100°–150° F.) to avoid possible difficulties in releasing the frame material from the mold.

The bladders 60 and 61 and the cores 55 may optionally be removed, the bladders being withdrawn straight through the corresponding connector during disassembly thereof, and the foam cores being dissolved in an appropriate solvent. However, because the bladders are extremely light and the amount of foam core material is relatively small, both the bladders and the cores may be left in place without appreciably affecting the final weight of the unitary bicycle frame. Furthermore, since the opening 101 in the exterior of the bottom bracket junction 38 is at a relatively hidden location, there is no real need to fill and/or cover the hole 101 for the aesthetic appearance of the frame.

As shown in FIG. 6, the long bladder 60 may be routed from a modified head tube lay-up 91', through the top tube lay-up 88, through a modified seat post sleeve 32' and seat tube lay-up 90, to a frame exterior opening 105 in a modified bottom bracket lay-up 93'. This modification of the bottom bracket lay-up 93' and bottom junction mold section 27' permits the extension 70 of bladder 60 to exit in a generally straight line relative to seat tube lay-up 90. The mold 12' and the bottom bracket lay-up 93' have been modified to align the apertures 68—68 of bottom bracket sleeve 34 with the seat tube lay-up 90 instead of the down tube lay-up 89 as in FIG. 1. The head tube mold section 20' and the head tube junction lay-up 91' have been modified to permit the second, shorter bladder 61 to exit in a generally straight line from down tube lay-up 89 through a frame exterior opening 106 in modified head tube lay-up 91'. The seat tube sleeve 32' has been modified by providing a single transverse hole 33 which allows bladder 60 to bend through sleeve 32' as it traverses the generally hollow seat junction.

Thus, when the sleeve 34 is wrapped into the bottom bracket junction as the frame is assembled, the transverse apertures 68—68 may be aligned with either the seat tube lay-up 90 as shown in FIG. 6, or sleeve 34 may be rotated so as to align apertures 68—68 with the down tube lay-up 89 as shown in FIG. 1. Either of these positions allow a bladder in the corresponding lay-up to exit the frame and the mold in substantially a straight line. The bottom bracket sleeve, as well as the seat post and head tube sleeves, may be made of metal or plastic, and the necessary apertures may be provided therein by drilling a hole through one or both sides of the cylindrical sleeve as appropriate. Whereas the longitudinal axes of the head tube and the seat tube are in the symmetrical plane of the bicycle frame in which the wheels rotate, the longitudinal axis of the bottom bracket sleeve 34 runs substantially perpendicular to this plane of symmetry. The connector apertures 68—68 of the bottom bracket sleeve 34, as well as the corresponding connector apertures in modified head tube sleeves 30' and 30", are also aligned with this plane of symmetry of the bicycle frame.

Referring now to FIG. 7, the shorter bladder 61 may be arranged in the down tube lay-up 89 so as to exit in a generally straight line through the frame exterior opening 101, which is in the same position as in FIG. 1 but in this embodiment is penetrated by the short bladder connector 65' instead of the long bladder connector 65. The longer bladder 60 is routed from the bottom bracket junction lay-up 93 through the seat tube lay-up 90, through the seat tube junction lay-up 92 and modified seat post sleeve 32', through the top tube lay-up 88, to a frame exterior opening 108 in a modified head tube lay-up 91". The head tube lay-up 91" and the head junction section 20" of lower mold piece 12" have been modified so that the connector 65 of long bladder 60 exits through a modified head tube sleeve 30" in a generally straight line with the top tube lay-up 88.

It is evident from the foregoing that long bladder 60 will always bend through an acute angle at an intermediate position between its closed and open ends. The acute angle bend of the long bladder could be eliminated by using three separate bladders which respectively exit the mold through the seat post sleeve 32 and the bottom bracket sleeve 34 of FIG. 1 and the modified head tube sleeve 30" of FIG. 7.

Referring now to FIG. 8, access to the bladders also may be obtained through any necessary opening in the bicycle frame, such as the passage 107 for receiving a head tube sleeve, the passage 109 for receiving a seat post sleeve, and/or the passage 114 for receiving a bottom bracket sleeve. By way of example, an inlet extension 115 of a top tube bladder 116 may exit from passage 110 for the head tube sleeve, an inlet extension 117 of a seat tube bladder 118 may exit from passage 112 for the seat tube sleeve, and an inlet extension 119 of a down tube bladder 120 may exit from passage 114 for the bottom bracket sleeve. The inlet extensions of bladders 116, 118, and 120 may exit from these corresponding sleeve passages irrespective of whether the corresponding sleeve inserts are present or absent, as indicated by the phantom broken lines representing the head tube sleeve 122, the seat post sleeve 124, and the bottom bracket sleeve 126.

If the corresponding sleeve insert is present so as to be fixed into place during molding of the frame, a transverse aperture 128 is provided in head tube sleeve 122 and a transverse aperture 130 is provided in bottom bracket sleeve 126. Transverse apertures 128 and 130 and the axial run of the bladder inlet extension along the sleeve interior are selected so that the bladder inlet extension does not have to traverse a bend of more than 90° as it passes out of the frame lay-up and the surrounding mold. In this regard, bladder inlet extension 119 is shown laid over into the plane of FIG. 8 only because of the absence of the upper mold half which has a passageway (not shown) for routing extension 119 vertically out the mold without a second bend before its attachment to air connector 138, which is shown in phantom outline for this reason.

In the embodiment shown in FIG. 8, no transverse aperture is needed in seat post sleeve 124 since the inlet extension 117 of bladder 118 may pass along the axis of this sleeve and out of the frame and out of the mold in a substantially straight line. This is because the mold passageway 132 and the axial passageway of the seat post sleeve are in substantial alignment with the down tube mold section 22. As a further embodiment of the invention, the separate bladders 118 and 120 may be replaced by a single relatively long bladder, thereby eliminating the need for a third bladder inlet extension and associated hardware (items 119, 130, 138, and 139 in FIG. 8). This alternative is represented by phantom lines 143 and 144 which indicate that bladders 118 and 120 may be replaced by one long bladder with corresponding runs.

The outer open ends of bladder inlet extensions 115, 117 and 119 are connected by connectors 134, 136 and 138, to air supply hoses 135, 137 and 139, respectively. Each connector may have a structure wherein the mandrel 67 of FIG. 5 is replaced by a short threaded stub 140, which may remain unmounted or may be mounted on or adjacent to an exterior surface of the mold instead of being mounted within the mold as is mandrel 67. Stub 140 is clampingly engaged by an annular threaded fitting 141. Alternatively, the connectors may comprising conventional gas or air line couplings which also may be used to connect each bladder inlet extension to a source of pressurized air or other gas. The stub 140 and fitting 141 are made preferably of a rigid or semi-rigid material.

Although the foregoing three bladder arrangements will operate satisfactorily, a stronger frame may be obtained by reducing, as far as possible, the number of bladders used to provide internal pressure in the frame as it cures. This is because compression of the fiber reinforced resin layers against the inside surfaces of mold 10 at the common junctions between the elongated tubular portions of the frame may be applied more uniformly by a bladder which passes entirely through the junction. In addition, the modified head tube arrangements of FIGS. 6 and 7 may be less desirable than the bladder exiting arrangements of FIGS. 1 and 8 for aesthetic reasons, because an opening in the exterior of the frame at the head tube is in an exposed location and therefore must usually be patched or otherwise covered.

While using one long bladder entering at the seat tube sleeve 32 might otherwise be ideal, the combination of two acute angle bends required by this method of routing may cause crimping or collapse of segments of this extraordinarily long bladder, resulting in either rupture or failure to fully inflate. Therefore, for most frame configurations, the presently preferred methods employ the two bladders 60 and 61.

One could, of course, construct and use in lieu of a standard straight bladder, a single triangular shaped bladder with an inlet extension through the seat tube sleeve 32 similar to the valve and inner tube arrangement for an automobile or bicycle tire. However, such a one-piece bladder is undesirable because it would be expensive to make and a different size triangular bladder would have to be used for each different frame size. Such a bladder also would be extremely difficult to remove from the frame after it is cured. In addition, it would be difficult to use such a triangular bladder if one or more of the tube portions are pre-shaped on a mandrel in accordance with the alternative method described below.

As an alternative to laying-up the complete front triangle in the mold as shown in FIGS. 1, 6, 7 and 8, one or more individual portions of the frame, such as the top tube portion, the down tube portion, and/or the seat tube portion, may be pre-wrapped and then united with patches of composite material to form an uncured front triangle shell. The portions of this shell might be united entirely outside of the mold and the united shell then placed in the mold along with the pre-wrapped seat stay and chain stay portions. For example, a top tube portion, a seat tube portion, and a down tube portion may be pre-wrapped by wrapping resin impregnated fabric of composite fibers on three mandrels having the approximate shapes and sizes of the interior cavities of the corresponding tube portions of a finished front triangle. This may require elimination of all or at least part of the curvature 85 in the rearward wall of the seat tube, which curvature follows the radius of curvature of the bicycle wheel of the rear wheel assembly.

The tubular portion wrapped on each mandrel is removed in an uncured state and these individual portions are connected with junction patches to provide an uncured shell for forming the front triangle of the bicycle frame. Before these individual portions of the frame are connected, the inflatable bladders 60 and 61 are inserted into and pulled through the top tube portion, the seat tube portion and the down tube portion. As the portions of the frame shell are being assembled, the metal sleeves 30, 32 and 34 are inserted and held in place using the resin impregnated fabric patches for the common hollow junctions. During or after the individual portions of the frame shell are assembled, exterior openings are provided through the uncured shell for exiting the bladder inlet extensions so that the bladder inlet extensions may be connected to an airline, by any of the connector arrangements of FIGS. 1 and 4-8.

To manufacture a round tube frame, the top tube portion, the seat tube portion and the down tube portion may be separately produced by wrapping fiber strips impregnated with the resin around a cylindrical mandrel to provide a round tubular structure. Depending upon the strength characteristics desired in the particular portions, some of the strips may be spirally wound and some may be folded over longitudinally and wrapped lengthwise to provide multiple layers. Spiral windings of successive layers are preferably wound in opposite directions using long strips of resin impregnated fabric, preferably about 2 to 4 inches in width. Preferably, windings of a strip in the same layer are not overlapped in order to ensure an even surface finish. The outside diameter of the wrapping mandrel approximately corresponds to the finished inside diameter of the particular portion being produced. Each such portion is wrapped layer by layer over the mandrel. The number of layers used depends upon the desired wall thickness of the particular portion in the finished frame. For example, about 8 layers of some prepregs have been found to produce a wall thickness in the finished frame of about 60 mils. Following wrapping, the tubular portions are slid axially off the mandrel.

The direction of wrapping the layers in relation to the longitudinal axis of each portion is important. When the preferred unidirectional fibers are used for the top tube portion, the down tube portion, the seat stay portions, and the chain stay portions, about one-fourth to about one-half of these fibers may be positioned at an angle between 0° and 45°, preferably about 30°, relative to the longitudinal axis of these elongated portions, with the remaining fibers being generally parallel to the longitudinal axis. This orientation of fibers is believed to improve the strength of these members for carrying bending and torsional stresses. Thus, for example, in a frame employing 8 layers of resin impregnated fiber, 2 layers oriented at a 30° angle relative to the longitudinal axis will provide 25% angled fibers and 75% longitudinal fibers. It is also clear that layers can be wrapped so that one 30° layer is set at a 90° angle relative to the previous 30° layer. In the seat tube portion, the unidirectional fibers are preferably substantially all parallel to the longitudinal axis.

As illustrated in FIGS. 9-12, patches 154 of resin impregnated fiber material are used to unify the tubular portions, such as top tube portion 148, head tube portion 151 and down tube portion 152, by forming a common hollow junction therebetween, such a head junction 150 through which is routed the bladder 60. Similar patches are used to from the common junctions for the rear wheel support means, pedal support means, and seat support means. Approximately one-half of each patch 154 is preferably laid up as a segment in a corresponding half of the mold with a sufficient overlap between the upper and lower segments of the patch to integrally unite the two segments upon curing. A half-inch overlap, for example, has been found to produce satisfactory results.

The patch segments may be laid up in the mold either before or after the corresponding tubular portions are laid up, and either before or after any preformed tubular portions are placed therein. The patches are cut so that they overlap an end segment of the corresponding tubular portion. An overlap of from about one inch to about two inches, for example, has been found to satisfactorily unify the tubular portions and the hollow junctions. Alternatively, the patches may be formed around the ends of the tubular portions on a table, and the frame shell thus assembled is then placed in the mold. Any metal sleeves or other inserts, for example, the seat post sleeve, head tube sleeve, rear dropouts and bottom bracket sleeve, are preferably embedded at the time the hollow junctions are being shaped and overlapped. For example, the legs 156 and 157 of the rear dropout 37 (FIG. 8) are inserted in the ends of chain stay portion 36 and seat stay portion 39, respectively, and are embedded therein using the same resin as impregnates the fibrous prepreg strips, as a recess 158 is formed in the rear wheel junction 160 to receive the head 159 of dropout 37.

After the bladders and foamable cores are in place, the entire frame shell is then assembled by joining the mold pieces so that they enclose the uncured frame shell. A single bladder is preferably used for the top and down tube portions and second bladder for the seat tube portion. The bladders are then inflated to a pressure of about 15 psig to about 500 psig, preferably to about 100 psig. Heat is thereafter applied to the mold to cure the resin and expand the foamable cores in accordance with the resin manufacturer's recommendations. For example, when a preferred fiber and resin prepreg from the Fiberite Company is used, the mold is heated to a temperature of about 250°. The internal pressure from the bladders and from the expanding resin cores within the seat stay and chain stay portions compresses the fiber/resin layers and the overlapped edges and ends together and against the interior surfaces of the mold cavity as the resin is cured.

When the resin is cured, the mold is opened while still warm, and the integral unitary frame is removed. The bladders are deflated and may be removed or, because of their light weight, may be left within the hollows of the tube portions of the front triangle. The expanded resin cores may be removed from the seat stay and chain stay portions of the rear triangle by dissolution with an appropriate solvent, or may be left in place because their small size adds relatively little weight.

A front triangle frame component thus formed has a wall thickness ranging from about 35 mils to about 125 mils, preferably about 45 mils on the average. Because wall thickness depends upon the number of layers of resin impregnated fiber used initially to form the various parts of the frame shell, the wall thickness of the various parts can be selectively increased or decreased during manufacture, depending upon the strength and performance characteristics desired. The result is a bicycle frame having an unusually low weight ("ultralight") while providing unexpectedly high levels of strength, rigidity and durability. The aerodynamic design preferred also provides unusually low aerodynamic drag of a level formerly achievable only with a monocoque-type frame but without the cross-wind sensitivity of monocoque-type frames. The integral one-piece design preferred eliminates the problems of joint failure commonly experienced by conventional frame assemblies.

One skilled in the art will recognize that certain production advantages may arise by applying the methods disclosed above to the independent production of one or more separately cured component parts of a molded composite bicycle frame. Thus, these methods can be used to produce a unitary bicycle frame component comprising at least one hollow tubular portion integrally united to at least one hollow junction. For example, a unitary front triangle shell (uncured) could be produced and the frame completed by adding two separate precured unitary stay assemblies, one comprising two chain stay portions joined at their forward ends by a common Y-shaped junction and the other comprising two seat stay portions joined at their forward ends by a second common Y-shaped junction. An integral connection between the cured and uncured frame components may be formed by providing the corresponding common junctions of the front triangle with slip fit connections for receiving the stay components.

As shown in FIG. 13, each stay component comprises opposing chain stays 161 and 162 and a common Y-junction 164 having a hollow trunk 165 for receiving both a stub and a pressing means. The stay component may be laid up, and then molded and cured in a separate mold 178 while pressurized with dual bladders 179 and 180. The hollow of trunk 165 provides a socket 166 which slips over a hollow projecting stub 168 and both socket 166 and stub 168 may receive internally a closed end extension 170 of a seat tube bladder 61' as shown in FIG. 14. Stub 168 is preferably uncured at the time of molding and includes an expansion means 172 in the form of two overlapped longitudinal edges of the flexible prepreg material from which both the stub 168 and the bottom bracket junction 174 are made. Upon pressurizing bladder 61' and heating the mold, a moldably bonded connection is formed between stub 168 and the surrounding end segment of trunk 165. Alternatively, the hollow trunk 165 may provide a smaller diameter stub which slips inside of a hollow projecting socket formed at the same location as stub 168 previously described.

The circumferential juncture 171, as formed by the overlapped portions of stub 168 and trunk end segment 165, may be further reinforced by a reinforcing strip 173 commencing at an intermediate position along down tube portion 152 and extending entirely across bottom bracket junction 176 and into the wall of stub 168, as illustrated by the broken line 175 shown in FIG. 14. To increase the structural continuity of fibers across junction 176, it also may be desirable to extend reinforcing strip 173 entirely past the circumferential juncture 171 to an intermediate position within trunk 165 or the chain stays 161 and 162, as illustrated by broken line 181. Strip 173 also may commence at an intermediate position along the seat tube portion and extend entirely across a quadrant of junction 176 and into or past stub 168. Alternatively, strip 173 may be run as shown and a second reinforcing strip (not shown) may be run in this latter fashion to provide a reinforcing continuity of fibers from both the down tube and the seat tube. Similar reinforcing strips may be run through the seat junction to provide an additional reinforcing continuity of fibers and/or to form a stub for pre-cured seat stays similar to stub 168 or a stay socket as previously described.

As a further alternative, the rearwardly extending end portion of reinforcing strip 173 may be folded over longitudinally and the edges thereof overlapped so as to form at least one layer, or substantially all, of stub 168, with the overlap edges providing part or all of expansion means 172 as shown in FIG. 14. The rearwardly extending end portion of reinforcing strip 173 also may be folded over longitudinally to form a socket of larger diameter for receiving a corresponding end portion of a stay tube portion. The solid lines L9 illustrate the longitudinal direction of at least one layer of the unidirectional fibers in the reinforcing strip 173. Although the width of reinforcing strip 173 is shown more narrow than the transverse width of down tube 152 for purposes of clarity, this reinforcing strip, as well as the others described above, may have a width equal to one-half or more of the circumference of the corresponding tube portion or junction, or may extend around substantially the entire circumference of the corresponding tube portion or junction, with appropriately located holes or slits to allow proper placement of a corresponding metal insert, such as sleeves 30, 32 and 34.

Alternatively, the chain stay portions and seat stay portions with hollow common junctions, such as junction 160 (FIG. 8), may be molded and cured as separate components and then connected to an uncured front triangle by providing two pairs of hollow stubs (not shown), one pair projecting rearwardly from the bottom junction and the other pair projecting rearwardly from the seat junction. The ends of the two chain stay portions and the ends of the two seat stay portions are then slid over the bottom junction stubs and the seat junction stubs, respectively. Each of these four hollow stubs may be uncured and provided internally with an expansion means, similar to that for stub 168, for pressing the stubs against the interior surface of the ends of the precured stay portions, as the uncured prepreg of the stubs is cured, thereby moldably bonding the stubs to the ends of the precured stay portions during a final cure of the front triangle. When this means of connection is used, the stubs extend into the ends of the hollow attached stay portions preferably at least about one inch and more preferably between about one and about two inches. Additional resin may be placed on the surface of the stubs at the interface between the stubs and the inner surface of the overlapping precured hollow stay portions. The entire assembly is then cured as disclosed above.

Following cure, the unitary stay assemblies or the individually connected stay components will be integrally attached to the front triangle by the overlapped fibers of the prepreg material. Furthermore, these connections will not be visible from the exterior because of the molding action of the stubs during the curing thereof. Connection to the front triangle also can be made by producing and curing the stay assemblies or the individual stay components separately, and then placing the precured stay assemblies or stay components in the patches used to form the common seat and bottom junctions and wrapping them into the front triangle in the same manner as disclosed above for the uncured wrapped stay portions.

Alternatively, a precured Y-shaped stay assembly or precured individual stay components can be rigidly attached by adhesive bonding to a front triangle which is produced and precured separately in accordance with the methods already described. Rigid attachment is assured by providing the ends of individual seat stays and the ends of individual chain stays or the common trunks of the Y-shaped dual chain and dual seat stay assemblies with sockets for a slip fit type of connection. Thus, as illustrated in FIG. 14, it is possible to provide the seat and bottom junctions with one or more rearwardly projecting stub connectors having an outer diameter only slightly smaller than the inner diameter of a corresponding socket, allowing the end of the individual stay or the Y-trunk to slip over a connector such as stub 168 and be faired into the front triangle at the rear of the common seat or bottom junction.

A rigid and permanent attachment is obtained by applying a suitable adhesive to the interface between the outer surface of the stub connector and the inner surface of the socket. This adhesive may be the same resin used in the prepreg or another resin adhesive compatible therewith. The legs of rear wheel dropouts for a united rear triangle can be similarly attached to the other ends of the stays to complete the bicycle frame. Thus, a frame can be obtained which has fewer joints than a conventional bicycle and which may provide production advantages over an entirely integral frame. Although an adhesively bonded connection between a precured stub and a precured stay assembly or component has a structure that may appear similar to that of FIG. 14 (without bladder extension 170 and the expandable overlap 172), the resulting connection includes a clearly defined layer of adhesive which may have a thickness and discontinuities which may block the fiber to fiber stress transfer provided by an integral connection. Discontinuities in the adhesive layer also may cause undesirable concentrations of tensile and compressive stresses.

FIGS. 15 and 17 show a frame 200 of the present invention, which comprises a generally hollow, tubular top tube portion 17 extending between steering support means 226 and seat support means 227; a generally hollow, tubular down tube portion 218 extending between the steering support means 226 and the pedal support means 225; a generally hollow, tubular seat tube portion 220 extending between the seat support means 227 and a pedal support means 225; a first and a second generally hollow, tubular chain stay portions 219, 219', the first such portion 219 extending from the left side of pedal support means 225 to the left side of rear wheel support means 224 and the second such portion 219' extending from the right side of pedal support means 225 to the right side of rear wheel support means 224'; and a first and a second generally hollow, tubular seat stay portions 221, 221', the first such portion 221 extending from the left side of seat support means 227 to the left side rear wheel support means 224, and the second such portion 221' extending from the right side of seat support means 227 to the right side rear wheel support means 224'.

In this configuration, the top tube portion 217, down tube portion 218, and seat tube portion 220 form an open front triangle, and the seat tube portion 220, chain stay portions 219, 219' and seat stay portions 221, 221' form a pair of open rear triangles. A right rear triangle is composed of right chain stay portion 219', right seat stay portion 221', and seat tube portion 220, and a left rear triangle is composed of left chain stay portion 219, left seat stay portion 221, and seat tube portion 220.

Steering support means 226 includes a hollow junction and associated elements for rotatably supporting at the bottom end a front fork assembly 222 and front wheel assembly and, at the top end, a handle bar assembly (not shown). Seat support means 227 includes a hollow junction and associated elements for adjustably receiving the post of a seat assembly. Pedal support means 225 includes a hollow junction and associated elements for supporting a pedal crank and chain wheel assembly (not shown). Each rear wheel support means 224, 224' include a hollow junction which includes a slotted rear wheel dropout having a head 230, 230', a first leg 231, 231' and a second leg 232, 232' to support the axle of a rear wheel assembly. The hollow junction of each rear wheel support means 224, 224' is preferably provided with a recess 234, 234' for receiving the head 230, 230' of the rear wheel dropout. The recess 234, 234' may be either cut out of a previously molded junction or, preferably, molded as part of the junction when the frame is constructed, with the dropout being placed in position after the frame material has been laid up but before the uncured frame is cured in the mold. The molded recess 234, 234' will preferably conform closely to the shape of dropout received such that the dropout will not move out of position, even in the absence of additional adhesion between the dropout and the molded recess 234, 234', thus providing a means for permanently and securely attaching a rear dropout to the frame at each rear wheel support means 224, 224'.

Additional support and stability is provided by first leg 231, 231', which is embedded within, and preferably attached by adhesive to the bottom portion of the generally hollow, tubular seat stay portion 221, 221', and by second leg 232, 232', which is embedded within, and preferably attached by adhesive to the back portion of the generally hollow, tubular chain stay portion 221, 221'.

Likewise, a steering support sleeve 226' may be embedded within the steering support means 226, a seat support sleeve 227' may be embedded within seat support means 227, and a bottom bracket 225' for receiving the pedal crank axle (not shown) may be embedded within the pedal support means 225.

FIGS. 16 and 19 through 26 show the preferred cross-sectional shape of various portions of a unitary frame according to the present invention. Although the cross-sectional shape of the various hollow, tubular portions may have a round aerodynamic shape, non-circular, airfoil type cross-sectional shapes are preferred. This aerodynamic cross-sectional shape preferably extends along a majority of the length of the elongated tubular portions, more preferably over substantially the entire length thereof. The preferred aerodynamic shapes are substantially symmetrical relative to an imaginary plane in which both the front and rear wheels rotate, preferably the plane passing through substantially the center of the geometric cross-sectional shape of a rear tire carried by the wheel assembly.

FIG. 21 generally illustrates the most preferred cross-sectional shape for a tubular seat tube portion which includes a pair of trailing edges 237, 237' and a concave rear wall 238 having a uniform cross-sectional curvature which substantially follows the cross-sectional curvature or outline of the tire of the rear wheel assembly. Rear wall 238 preferably also has a uniform longitudinal curve which follows the curve of the circumference of the wheel of the wheel assembly, as shown by the dashed, curved line 240 in FIG. 15.

Regardless of the cross-sectional shape of the various portions of the frame of the present invention, sufficient clearance is provided between the surfaces of the various portions of the frame and the attached components, such as the rear wheel assembly and front wheel assembly, to permit normal operation of the bicycle without abnormal interference from the frame, for example, free tire rotation without contact between the tire surface and the frame surfaces.

The present invention thus provides a bicycle frame having unusually low weight while providing unexpectedly high levels of rigidity, resilience and durability. The preferred tubular structure further provides unusually low aerodynamic drag of a level achievable in the past only with bicycle frames of the monocoque type. The preferred one-piece integral construction provides a substantially continuous hollow shell without welded, adhesively bonded or abutting joints. This reduces problems of joint failures caused by excessive stress concentrations which have arisen in the past when bicycle frames have utilized tubular members and other frame components connected by such joints which may have stress concentrating discontinuities.

The rigidity and durability of the bicycle frame of the invention is believed to be enhanced where the forward ends of the chain stays and the forward ends of the seat stays are formed integrally with the common junctions at each end of the seat tube portion, and the rear ends of the chain stays are formed integrally with the rear ends of the seat stays to provide common junctions with recesses for receiving and supporting the slotted rear dropouts.

One skilled in the art will recognize that it would be possible to construct the front and rear triangle frame components from a variety of materials and to modify the method of making these components in ways other those described above. While the best and other specific modes of the invention have been described in detail, and shown in the accompanying drawings, these are only specific examples of the invention and it will be evident that various modifications, other than those described herein, are possible without departing from the scope of the invention.

What is claimed is:

1. A method of making a unitary cycle frame component for providing at least a portion of a frame for connecting together at least two of a steering support means for supporting a fork assembly, a seat support means for supporting a seat assembly, a pedal support means for supporting a pedal assembly, and a wheel support means for supporting a wheel assembly, said method comprising:

forming at least two exterior wall sections each adjacent to another and comprising at least one layer of fibrous material impregnated with a synthetic resin;

overlapping a part of each of said sections with a corresponding part of another of said sections to form a shell of a size corresponding to the size of said frame portion, the resin of at least one of said corresponding parts being substantially uncured;

providing a first pressing means within said shell and adjacent to one of said overlapped parts;

providing a second pressing means outside of said shell and adjacent to the other of said overlapped parts;

causing said first and second pressing means to compress said overlapped parts together; and, curing said uncured part(s) of said shell while under said compression to form said unitary cycle frame component, said compression and curing causing said overlapped parts to form at least one pressure cured juncture integrally uniting said adjacent wall sections together to form a substantially continuous exterior wall of cured resin impregnated fibrous material, and said exterior wall providing a structural wall such that said unitary cycle frame component does not require internal structural components.

2. A method according to claim 1 wherein said shell is elongated and extends longitudinally for a distance sufficient to connect at least two of said support means.

3. A method according to claim 1 wherein said shell comprises at least one longitudinally extending and generally hollow tubular portion overlapped with at least one generally hollow junction portion, and the compression and curing of said shell provide a pressure cured juncture integrally uniting said generally hollow tubular portion and said generally hollow junction portion to form a generally hollow unitary cycle frame component.

4. A method according to claim 3 wherein said generally hollow tubular portion is individually formed by wrapping at least one elongated strip of said resin impregnated fibrous material around a mandrel means, said individually formed generally hollow tubular portion then being overlapped with said generally hollow junction portion to form at least a segment of said shell.

5. A method according to claim 1 wherein said wall sections comprise separate pieces of resin impregnated fibrous material forming opposing portions of at least a segment of said unitary cycle frame component, the transverse widths of said pieces of fibrous material being sufficient to form two pairs of overlapped edge parts, each of said overlapped edge parts providing a pressure cured juncture in opposing relation to a pressured juncture provided by the other pair, and said pressure cured junctures integrally uniting said separate pieces to provide said exterior structural wall, said wall extending around opposite sides of said unitary cycle frame component.

6. A method according to claim 1 wherein said second pressing means comprises molding means placed around said shell in opposing relation to said first pressing means, and wherein said first pressing means is activated to compress said uncured part(s) of said shell against an opposing surface of said molding means.

7. A method according to claim 1 wherein said first pressing means comprises an expandable foam within at least part of said shell, and said foam expands during said compression step.

8. A method according to claim 1 wherein said first pressing means comprises at least one bladder positioned within at least part of said shell, and wherein said compression step includes inflating said at least one bladder with a pressurized fluid.

9. A method according to claim 1 wherein the resin of the other of said corresponding parts is precured by a substantial amount before said corresponding parts are overlapped.

10. A method according to claim 1 wherein the resin of both of said corresponding parts is substantially uncured when said corresponding parts are overlapped.

11. A method according to claim 1 wherein said synthetic resin is heat curable and said curing step comprises heating said shell while under said compression to form said unitary cycle frame component.

12. A method according to claim 1 wherein at least a part of one or more of said steering support means, said seat support means, said pedal support means and said wheel support means is placed within said shell prior to said compression, and said compression and curing cause said support means part(s) to be embedded in said exterior structural wall of the unitary cycle frame component.

13. A method according to claim 1 wherein an elongated strip of resin impregnated fibrous material is folded longitudinally such that said wall sections are formed by opposing portions of said folded strip, and longitudinally extending edge parts of said folded strip are overlapped to form said shell.

14. A method of making a unitary cycle frame component for providing at least a portion of a frame for connecting together at least two of a steering support means for supporting a fork assembly, a seat support means for supporting a seat assembly, a pedal support means for supporting a pedal assembly and a wheel support means for supporting a wheel assembly, said method comprising:

forming at least two exterior wall sections each adjacent to another and comprising at least one layer of fibrous material impregnated with a synthetic resin;

overlapping a part of each of said sections with a corresponding part of another of said sections to form a shell of a size corresponding to the size of said frame portion, the resin of at least one of said overlapped parts being substantially uncured, and said shell having an interior chamber for receiving a first pressing means;

placing said first pressing means in the interior chamber of said shell and adjacent to one of said overlapped parts;

placing a second pressing means adjacent to the other of said overlapped parts;

activating said first pressing means to compress said overlapped parts together; and curing said uncured part(s) of said shell while under said compression to from said unitary cycle frame component, said compression and curing causing said overlapped parts to form at least one pressure cured juncture integrally uniting said adjacent wall sections together and providing a substantially continuous exterior wall of cured resin-impregnated fibrous material around an interior chamber of said unitary cycle frame component, said integrally uniting juncture comprising overlapping layers of resin-impregnated fibrous material provided by said overlapped parts of said adjacent wall sections, and said exterior wall providing a structural wall such that said unitary cycle frame component does not require internal structural components.

15. A method according to claim 14 wherein the resin of both of said parts is substantially uncured when said parts are overlapped.

16. A method according to claim 14 wherein said second pressing means comprises molding means placed around said shell in opposing relation to said first pressing means, and wherein said first pressing means is activated to compress said uncured part(s) of said shell against an opposing surface of said molding means.

17. A method according to claim 14 wherein said first pressing means comprises an expandable foam within at least part of said shell, and said foam expands during said compression step.

18. A method according to claim 14 wherein said first pressing means comprises at least one bladder positioned within at least part of said shell, and wherein said compression step includes inflating said at least one bladder with a pressurized fluid.

19. A method according to claim 14 wherein at least a part of at least one of said steering support means, said seat support means, said pedal support means, and said wheel support means is placed in a corresponding portion of said interior chamber prior to said compression, and said compression and curing cause said support means part(s) to be embedded in said unitary wall around said interior chamber.

20. A method according to claim 14 wherein said shell is elongated and extends longitudinally for a distance sufficient to connect at least two of said support means.

21. A method according to claim 14 wherein said wall sections comprise separate pieces of resin impregnated fibrous material forming opposing portions of at least a segment of said unitary cycle frame component, the transverse widths of said pieces of fibrous material being sufficient to form two pairs of overlapped edge parts, each of said overlapped edge parts providing a pressure cured juncture in opposing relation to a pressure cured juncture provided by the other pair, and said pressure cured junctures integrally uniting said separate pieces to provide said exterior structural wall, said wall extending around opposite sides of said unitary cycle frame component.

22. A method according to claim 14 wherein an elongated strip of resin impregnated fibrous material is folded longitudinally such that said wall sections are formed by opposing portions of said folded strip, and longitudinally extending edge parts of said folded strip are overlapped to form said shell.

* * * * *